United States Patent
Sakamoto et al.

(10) Patent No.: US 9,437,881 B2
(45) Date of Patent: Sep. 6, 2016

(54) REINFORCING MATERIAL FOR SOLID POLYMER FUEL CELL, AND COHESIVE/ADHESIVE COMPOSITION FOR USE IN SAME

(75) Inventors: Hirotoshi Sakamoto, Tokyo (JP); Takahisa Taniguchi, Tokyo (JP); Koujun Utaka, Tokyo (JP); Hidenori Asai, Tokyo (JP); Kazufumi Kodani, Tokyo (JP); Kuniaki Yoshikata, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 299 days.

(21) Appl. No.: 14/111,123

(22) PCT Filed: Apr. 10, 2012

(86) PCT No.: PCT/JP2012/059770
§ 371 (c)(1),
(2), (4) Date: Jan. 10, 2014

(87) PCT Pub. No.: WO2012/141167
PCT Pub. Date: Oct. 18, 2012

(65) Prior Publication Data
US 2014/0127608 A1 May 8, 2014

(30) Foreign Application Priority Data

Apr. 11, 2011 (JP) .................................. 2011-087289
Nov. 24, 2011 (JP) .................................. 2011-256410

(51) Int. Cl.
| | |
|---|---|
| C09J 7/02 | (2006.01) |
| H01M 8/02 | (2016.01) |
| H01M 8/10 | (2016.01) |
| C09J 163/00 | (2006.01) |
| C09J 177/02 | (2006.01) |
| C09J 177/06 | (2006.01) |

(52) U.S. Cl.
CPC .............. *H01M 8/0273* (2013.01); *C09J 7/02* (2013.01); *C09J 163/00* (2013.01); *C09J 177/02* (2013.01); *C09J 177/06* (2013.01); *H01M 8/028* (2013.01); *H01M 8/0284* (2013.01); *H01M 8/1004* (2013.01); *C09J 2203/33* (2013.01); *C09J 2463/00* (2013.01); *C09J 2477/00* (2013.01); *C09J 2481/00* (2013.01); *H01M 2008/1095* (2013.01); *Y02E 60/521* (2013.01)

(58) Field of Classification Search
CPC ........ C09J 7/02; C09J 163/00; H01M 8/026; H01M 8/1004
USPC ................... 523/400, 453; 429/482, 509, 535
See application file for complete search history.

(56) References Cited

U.S. PATENT DOCUMENTS 4,334,073 A    6/1982 Diehr

FOREIGN PATENT DOCUMENTS

| JP | 55-71763 A | 5/1980 |
|---|---|---|
| JP | 55-102624 A | 8/1980 |
| JP | 2-294322 A | 12/1990 |
| JP | 05-242897 A | 9/1993 |
| JP | 07-169448 A | 7/1995 |
| JP | 10-060097 A | 3/1998 |
| JP | 2000-37658 A | 2/2000 |
| JP | 2000-37659 A | 2/2000 |
| JP | 2000-38540 A | 2/2000 |
| JP | 2004-211038 A | 7/2004 |
| JP | 2004-277444 | * 10/2004 |
| JP | 2004-277444 A | 10/2004 |
| JP | 2010-275545 A | 12/2010 |
| JP | 2011-017820 A | 1/2011 |

OTHER PUBLICATIONS

Internatioanl Search Report of PCT/JP2012/059770, mailing date of Jul. 24, 2012.
Extended European Search Report dated Nov. 12, 2014, issued in corresponding application No. PCT/JP2012059770. (6 pages).

* cited by examiner

*Primary Examiner* — Edward Cain
(74) *Attorney, Agent, or Firm* — Westerman, Hattori, Daniels & Adrian, LLP

(57) ABSTRACT

There is provided a reinforcing material equipped with a cohesive/adhesive layer, having a proper initial adhesion force to an adherend, such as an electrolyte membrane, a catalyst layer and a gas diffusion layer, and which can be temporarily fixed readily. A reinforcing material produced by forming a cohesive/adhesive layer on a substrate. The cohesive/adhesive layer includes an aliphatic polyamide, an epoxy resin and a polythiol. When the reinforcing material is used, it becomes possible to correct the position of an adherend after the adhesion of the reinforcing material to the adherend. In addition, it can prevent the formation of wrinkles on the adherend or the like upon the adhesion of the reinforcing material. Therefore, a catalyst layer laminated membrane or the like which has a reinforcing material attached thereto can be produced readily without requiring the employment of any highly skilled technique.

13 Claims, 4 Drawing Sheets

REINFORCING MATERIAL FOR SOLID POLYMER FUEL CELL, AND COHESIVE/ADHESIVE COMPOSITION FOR USE IN SAME

TECHNICAL FIELD

The present invention relates to a reinforcing material which is used for a catalyst layer laminated membrane, a membrane-electrode assembly and the like in a polymer electrolyte fuel cell. The present invention also relates to a catalyst layer laminated membrane, a membrane-electrode assembly and a polymer electrolyte fuel cell which use a reinforcing material. Further, the present invention relates to a cohesive/adhesive composition which is suitably used for adhesion of an electrolyte membrane to a substrate, and a cohesive/adhesive sheet containing the cohesive/adhesive composition.

BACKGROUND ART

Fuel cells have electrodes arranged on both surfaces of an electrolyte membrane, generate power by an electrochemical reaction of hydrogen and oxygen, and produce only water as a by-product during power generation. Thus, unlike general internal combustion engines, the fuel cell does not produce an environmental load gas such as carbon dioxide, and is therefore expected to spread as a next-generation clean energy system. Above all, polymer electrolyte fuel cells, which are fuel cells using a polymer material for an electrolyte membrane, have a low operation temperature, and are expected to come into practical use early as a home cogeneration system and the like. The basic structure of the polymer electrolyte fuel cell includes a catalyst layer laminated membrane (CCM) produced by laminating catalyst layers to both surfaces of an electrolyte membrane having proton conductivity, and a membrane-electrode assembly (MEA) produced by laminating gas diffusion layers on the catalyst layer laminated membrane, wherein a gasket and a separator are placed on the MEA.

In recent years, the polymer electrolyte fuel cell has had a tendency toward thinning of the electrolyte membrane for power enhancement. As a result, the electrolyte membrane is easily broken, thus contributing to a reduction in durability of the fuel cell. As a method for solving this problem, a technique of reinforcing an electrolyte membrane by adhering a frame-shaped reinforcing material to a produced by laminating gas diffusion layers on the catalyst layer laminated membrane or a membrane-electrode assembly has been proposed (Patent Document 1).

In this catalyst layer laminated membrane or membrane-electrode assembly equipped with a reinforcing material, adhesion of the reinforcing material to the electrolyte membrane and the catalyst layer or the gas diffusion layer in the catalyst layer laminated membrane or the membrane-electrode assembly is performed by interposing an adhesive (adhesive layer) between each adherend and the reinforcing material. However, for example, conventional adhesives are poor in workability in bonding a reinforcing material to an electrolyte membrane, leading to a reduction in productivity. Specifically, since the adhesion force of the adhesive is excessively strong, it is difficult to correct the position of the reinforcing material once the reinforcing material is brought into contact with the electrolyte membrane, and wrinkles and the like generated on the electrolyte membrane during bonding cannot be removed. Conversely, the initial adhesion force of the adhesive is excessively weak, and therefore there is a problem that the reinforcing material is positionally displaced when the reinforcing material is pressure-bonded to the electrolyte membrane.

Accordingly, it has been desired to develop a reinforcing material which can be temporarily fixed to an adherend such as an electrolyte membrane, a catalyst layer and a gas diffusion layer (reinforcing material which allows itself to be adhered with a proper initial adhesion force) in production of a catalyst layer laminated membrane or membrane-electrode assembly equipped with a reinforcing material, and an adhesive that is used for the reinforcing material.

PRIOR ART DOCUMENT

Patent Document

Patent Document 1: Japanese Patent Laid-open Publication No. 5-242897

SUMMARY OF THE INVENTION

Problems to be Solved by the Invention

An object of the present invention is to provide a reinforcing material equipped with a cohesive/adhesive layer, which has a proper initial adhesion force to an adherend, such as an electrolyte membrane, a catalyst layer and a gas diffusion layer, and which can be temporarily fixed readily, and a catalyst layer laminated membrane, a membrane-electrode assembly and a polymer electrolyte fuel cell which use the reinforcing material. Another object of the present invention is to provide a cohesive/adhesive composition that is used for the reinforcing material.

Solutions to the Problems

The present inventors have extensively conducted studies for solving the above-described problems, and resultantly found that by using a reinforcing material produced by forming a cohesive/adhesive layer on a substrate, wherein the cohesive/adhesive layer contains an aliphatic polyamide, an epoxy resin and a polythiol, the position of an adherend can be corrected after the adhesion of the reinforcing material to the adherend, and wrinkles generated on the adherend and the like during bonding can be removed, so that a catalyst layer laminated membrane or the like equipped with a reinforcing material can be produced readily without requiring the employment of any highly skilled technique. The present invention has been completed by further conducting studies on the basis of the findings described above.

That is, the present invention relates to a reinforcing material, a catalyst layer laminated membrane equipped with a reinforcing material, a membrane-electrode assembly equipped with a reinforcing material, and a polymer electrolyte fuel cell, which have the features described below.

Item 1. A reinforcing material including a substrate and a cohesive/adhesive layer laminated on the substrate, wherein the cohesive/adhesive layer contains an aliphatic polyamide, an epoxy resin and a polythiol.

Item 2. The reinforcing material according to item 1, wherein the polythiol is solid at normal temperature.

Item 3. The reinforcing material according to item 1, wherein the cohesive/adhesive layer further contains an ionic liquid.

Item 4. The reinforcing material according to item 3, wherein the content of the ionic liquid in the cohesive/adhesive layer is 0.01 to 10% by mass.

Item 5. A catalyst layer laminated membrane equipped with a reinforcing material, including:

a catalyst layer laminated membrane including an electrolyte membrane and catalyst layers formed on both surfaces of the electrolyte membrane excepting outer peripheral edges thereof; and the reinforcing material according to any one of items 1 to 4, wherein the reinforcing material is in the shape of a frame having an opening, and the reinforcing material is adhered on the outer peripheral edge of at least one of the surfaces of the catalyst layer laminated membrane with a cohesive/adhesive layer of the reinforcing material interposed therebetween.

Item 6. A method for production of a catalyst layer laminated membrane equipped with a reinforcing material, the method including the steps of:

(i) adhering the reinforcing material according to any one of items 1 to 4, which is in the shape of a frame having an opening, to an outer peripheral edge of an electrolyte membrane with a cohesive/adhesive layer of the reinforcing material interposed therebetween, thereby obtaining an electrolyte membrane equipped with a reinforcing material; and (ii) laminating a catalyst layer to the electrolyte membrane exposed from the opening in the electrolyte membrane equipped with a reinforcing material, thereby obtaining a catalyst layer laminated membrane equipped with a reinforcing material.

Item 7. A membrane-electrode assembly equipped with a reinforcing material, including:

a membrane-electrode assembly including an electrolyte membrane and catalyst layers and gas diffusion layers sequentially laminated on both surfaces of the electrolyte membrane; and the reinforcing material according to any one of items 1 to 4, wherein the reinforcing material is in the shape of a frame having an opening, and the reinforcing material is adhered on the outer peripheral edge of at least one of the surfaces of the membrane-electrode assembly with a cohesive/adhesive layer of the reinforcing material interposed therebetween.

Item 8. A method for production of a membrane-electrode assembly equipped with a reinforcing material, the method including the steps of:

(i) adhering the reinforcing material according to any one of items 1 to 4, which is in the shape of a frame having an opening, to an outer peripheral edge of an electrolyte membrane with a cohesive/adhesive layer of the reinforcing material interposed therebetween, thereby obtaining an electrolyte membrane equipped with a reinforcing material; and (ii) sequentially laminating a catalyst layer and a gas diffusion layer or laminating a two-layer structure composed of a catalyst layer and a gas diffusion layer to the electrolyte membrane exposed from the opening in the electrolyte membrane equipped with a reinforcing material, thereby obtaining a membrane-electrode assembly equipped with a reinforcing material.

Item 9. A polymer electrolyte fuel cell including the membrane-electrode assembly equipped with a reinforcing material according to item 7.

The present invention also relates to a cohesive/adhesive composition and use thereof and a cohesive/adhesive sheet, which have the features described below.

Item 10. A cohesive/adhesive composition containing an epoxy resin, an aliphatic polyamide and a polythiol.

Item 11. The cohesive/adhesive composition according to item 10, wherein the polythiol is solid at normal temperature.

Item 12. The cohesive/adhesive composition according to item 10, further containing an ionic liquid.

Item 13. The cohesive/adhesive composition according to item 12, wherein the content of the ionic liquid is 0.01 to 10% by mass.

Item 14. The cohesive/adhesive composition according to item 10, which is used for adhesion of an electrolyte membrane to be used in a polymer electrolyte fuel cell.

Item 15. Use of a cohesive/adhesive composition containing an epoxy resin, an aliphatic polyamide and a polythiol for production of an adhesive for an electrolyte membrane to be used in a polymer electrolyte fuel cell.

Item 16. A cohesive/adhesive sheet, wherein a cohesive/adhesive layer formed of the cohesive/adhesive composition according to any one of items 10 to 14 is formed on a peelable protective film.

Advantages of the Invention

A reinforcing material of the present invention is suitable for temporary fixation because it has a proper initial adhesion force to an adherend such as an electrolyte membrane, so that the position of the reinforcing material can be corrected and wrinkles on the adherend can be removed before permanent adhesion (heat treatment or heat/pressure treatment) is performed. Further, the reinforcing material of the present invention exhibits a high adhesion force to an adherend after permanent adhesion (heat treatment or heat/pressure treatment), and can stably retain the adhesion force under a reaction atmosphere of a fuel cell, e.g. under a high-temperature condition and an acidic condition, and therefore the fuel cell can be made to have excellent durability.

Further, a cohesive/adhesive composition of the present invention has a proper initial adhesion force to an adherend, so that correction of the position of a reinforcing material and removal of wrinkles on an adherend can be easily performed, leading to a remarkable improvement in workability in bonding the reinforcing material to the adherend.

Conventionally, in a method for production of a catalyst layer laminated membrane equipped with a reinforcing material, when a frame-shaped reinforcing material having an opening is adhered to an electrolyte membrane, followed by laminating a catalyst transfer film to form a catalyst layer at the opening of the electrolyte membrane, there is a disadvantage that an adhesive leaks out from the frame of the reinforcing material due to heat/pressure during transfer, leading to a reduction in productivity and a degradation in performance of a cell. However, one aspect of the present invention (particularly, an aspect in which the cohesive/adhesive layer contains a polythiol which is solid at normal temperature) is suitable to mass production because the aforementioned disadvantage is eliminated, so that a catalyst layer laminated membrane equipped with a reinforcing material can be produced even under more severe conditions (e.g. 100° C. or higher and 0.5 MPa or more). Further, according to the cohesive/adhesive composition of the present invention of the aspect described above, an adherend and a reinforcing material can be adhered to each other without leakage of the cohesive/adhesive composition even under severe heat/pressure conditions.

EMBODIMENTS OF THE INVENTION

1. Reinforcing Material

Figure 1:
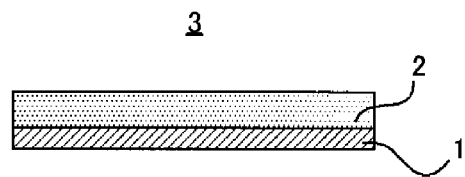
FIG. 1 shows one example of a sectional view of a reinforcing material of the present invention.

The reinforcing material of the present invention has a structure in which a cohesive/adhesive layer 2 is laminated on a substrate 1 as shown in FIG. 1. In the reinforcing material of the present invention, the cohesive/adhesive layer contains an aliphatic polyamide, an epoxy resin and a polythiol. Elements that form the reinforcing material of the present invention will be described below.

[Substrate]

The substrate to be used for the reinforcing material of the present invention is a substrate which is adhered to an adherend with a cured cohesive/adhesive layer interposed therebetween for the purpose of reinforcing the adherend. The substrate to be used for the reinforcing material of the present invention is appropriately set according to the use regardless of whether it is a plastic substrate, a metal substrate or a composite substrate thereof, but one having a gas barrier property is preferable when the reinforcing material is used as a reinforcing material for a catalyst layer laminated membrane or a membrane-electrode assembly. Specific examples of the substrate having a barrier property to water vapor, water, a fuel gas and an oxidant gas include polyesters, polyamides, polyimides, polymethylpentenes, polyphenylene oxides, polysulfones, polyetheretherketones, polyphenylene sulfides and fluororesins. As the polyester, mention is made of, for example, plastic substrates of polyethylene terephthalate, polyethylene naphthalate, polybutylene terephthalate, polybutylene naphthalate and the like. Metal substrates of aluminum, copper, zinc and the like; metal-deposited plastic substrates produced by depositing a metal such as aluminum, copper or zinc on a plastic substrate; oxide-deposited plastic substrates produced by depositing an oxide such as alumina, silica or Mania on a plastic substrate; and the like can also be used. Among these substrates, the polyester, particularly polyethylene naphthalate is preferable in terms of a gas barrier property, heat resistance, thermal dimensional stability and reduction of production costs.

When the reinforcing material of the present invention is made to have a function as a gasket, it is preferable to use a plastic substrate, an oxide-deposited plastic substrate or the like in terms of insulation quality.

The thickness of the substrate is not particularly limited, but when the reinforcing material of the present invention is used as a reinforcing material for a catalyst layer laminated membrane or a membrane-electrode assembly, the thickness of the substrate should be, for example, 6 to 500 μm, preferably 12 to 100 μm.

Figure 2:
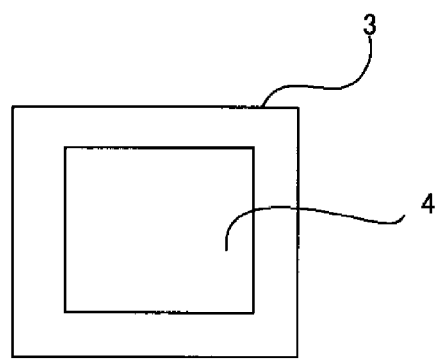
FIG. 2 shows one example of a front view of the present invention of a substrate that is used for the reinforcing material of the present invention.

The shape of the reinforcing material of the present invention is not particularly limited, and is appropriately set according to the use of an adherend, but when the reinforcing material is used as a reinforcing material for a membrane-electrode assembly or a membrane-electrode assembly, the reinforcing material is desired to be in the shape of a frame having an opening 2 as shown in FIG. 2.

[Cohesive/Adhesive Layer]

In the reinforcing material of the present invention, a cohesive/adhesive layer containing an epoxy resin, an aliphatic polyamide and a polythiol is laminated on a substrate. These components of the cohesive/adhesive layer are inseparably connected, so that the initial adhesion force becomes proper, leading to ease of temporary fixation. By using a cohesive/adhesive layer having the above-mentioned configuration, a high adhesion force is exhibited to an adherend after permanent adhesion (heat treatment or heat/pressure treatment), and the adhesion force can be stably retained under a reaction atmosphere of a fuel cell, e.g. under a high-temperature condition and an acidic condition.

The epoxy resin can be used regardless of whether it is a monoepoxy or a polyvalent epoxy. Examples of the monoepoxy resin include butyl glycidyl ether, hexyl glycidyl ether, phenyl glycidyl ether and allyl glycidyl ether.

Examples of the polyvalent epoxy resin include bisphenol type epoxy resins produced by glycidylating bisphenols such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A and tetrafluorobisphenol A; epoxy resins produced by glycidylating divalent phenols such as biphenol, dihydroxynaphthalene and 9,9-bis(4-hydroxyphenyl)fluorene; epoxy resins produced by glycidylating trisphenols such as 1,1,1-tris(4-hydroxyphenyl)methane; epoxy resins produced by glycidylating tetrakisphenols such as 1,1,2,2-tetrakis(4-hydroxyphenyl)ethane; epoxy resins produced by glycidylating other polyhydric phenols; aliphatic ether type epoxy resins produced by glycidylating polyhydric alcohols such as glycerin and polyethylene glycol; ether ester type epoxy resins produced by glycidylating hydroxycarboxylic acids such as p-oxybenzoic acid; ester type epoxy resins produced by glycidylating polycarboxylic acids such as phthalic acid and terephthalic acid; glycidyl type epoxy resins such as amine type epoxy resins such as those of triglycidyl isocyanurate; and alicyclic epoxides such as 3,4-epoxycyclohexylmethyl-3',4'-epoxycyclohexane carboxylate, 1,2:8,9-diepoxylimonene, 1,2-epoxy-4-(2-oxiranyl)cyclohexane of 2,2-bis(hydroxymethyl)-1-butanol.

Among these epoxy resins, preferable are polyvalent epoxy resins, further preferable are bisphenol type epoxy resins, and especially preferable are bisphenol A type epoxy resins, in terms of film formability and compatibility.

These epoxy resins may be used alone or used in combination of two or more thereof.

The epoxy equivalent of the epoxy resin is desired to be, for example, 100 to 1000 for improving the adhesion force after heat-pressure bonding, durability and the like while keeping the initial adhesion force proper. Here, the epoxy equivalent is the mass of a resin containing 1 equivalent of epoxy groups as measured using the method defined in JISK 7236.

As a commercial product of the epoxy resin, for example, jER828 (manufactured by Japan Epoxy Resins Co., Ltd.), jER1001 (manufactured by Japan Epoxy Resins Co., Ltd.), jER1004 (manufactured by Japan Epoxy Resins Co., Ltd.), jER1007 (manufactured by Japan Epoxy Resins Co., Ltd.), jER871 (manufactured by Japan Epoxy Resins Co., Ltd.), jER872 (manufactured by Japan Epoxy Resins Co., Ltd.), EPR-4030 (manufactured by ADEKA Corporation) or the like can be used.

In the cohesive/adhesive layer of the reinforcing material of the present invention, the content of the epoxy resin is not particularly limited, but it is, for example, 10 to 90% by mass, preferably 25 to 75% by mass based on the total mass of the cohesive/adhesive layer. By satisfying the content described above, the reinforcing material can be made to have a desired adhesion force more effectively.

Examples of the aliphatic polyamide include polycaproamide (nylon-6), polyaminoundecanoic acid (nylon-11), polylauryl lactam (nylon-12), polyhexamethylenediaminoadipic acid (nylon-66), polyhexamethylenediaminosebacic acid (nylon-610), polyhexamethylenediaminododecanoic diacid (nylon-612), a copolymer of caprolactam and lauryl lactam (nylon-6, 12), a copolymer of caprolactam and aminoundecanoic acid (nylon-6, 11), a copolymer of caprolactam, hexamethylenediaminoadipic acid and aminododecanoic diacid (nylon-6, 66, 612), a copolymer of caprolactam, polyhexamethylenediaminoadipic acid and lauryl lactam (nylon-6, 66, 12), a copolymer of caprolactam, polyhexamethylenediaminoadipic acid and polyhexamethylenediaminosebacic acid (nylon-6, 66, 610), a copolymer of caprolactam, polyhexamethylenediaminoadipic acid and polyhexamethylenediaminododecanoic diacid (nylon-6, 66, 612) and the like; block copolymers of the polyamide and a polyether-ester; and block copolymers of the polyamide and a polyester. Particularly, as the aliphatic polyamide resin, block copolymers of a polyamide, which has a dimer acid capable of providing a polymer which is tough and excellent in flexibility, and a polyether-ester; and block copolymers of the polyamide and a polyester are preferable.

These aliphatic polyamides may be used alone or used in combination of two or more thereof.

As the molecular weight of the aliphatic polyamide, for example, a mass average molecular weight of 1000 to 200000 is preferred for improving the adhesion force after permanent adhesion (heat treatment or heat/pressure-bonding treatment), durability and the like while making the initial adhesion force proper. Here, the mass average molecular weight is a value in terms of polystyrene as measured by gel permeation chromatography (GPC).

As a commercial product of the aliphatic polyamide, for example, TAPE-826-4S (manufactured by FUJI KASEI CO., LTD.), TAPE-826-5A (manufactured by FUJI KASEI CO., LTD.), NEWMIDE 515-ME (manufactured by Harima Chemicals Group, Inc.), NEWMIDE 945 (manufactured by Harima Chemicals Group, Inc.), NEWMIDE 947 (manufactured by Harima Chemicals Group, Inc.) or the like can be used.

In the cohesive/adhesive layer of the reinforcing material of the present invention, the content of the aliphatic polyamide is not particularly limited, but it is, for example, 5 to 80% by mass, preferably 10 to 50% by mass based on the total mass of the cohesive/adhesive layer.

The polythiol functions as a curing agent for the epoxy resin in the cohesive/adhesive layer. The polythiol for use in the present invention is not particularly limited as long as it has two or more thiol groups and is capable of curing the epoxy resin, and examples thereof include thiol compounds obtained by an esterification reaction of a polyol and a mercapto organic acid, such as trimethylolpropane tris(thioglycolate), pentaerythritol tetrakis(thioglycolate), ethylene glycol dithioglycolate, trimethylolpropane tris(β-thiopropionate), pentaerythritol tetrakis(β-thiopropionate), dipentaerythritol poly(β-thiopropionate) and pentaerythritol tris-thiopropionic acid esters; alkyl polythiol compounds such as 1,4-butanedithiol, 1,6-hexanedithiol and 1,10-decanedithiol; terminal thiol group-containing polyethers; terminal thiol group-containing polythioethers; thiol compounds obtained by a reaction of an epoxy compound and hydrogen sulfide;

thiol compounds having a terminal thiol group, which are obtained by a reaction of a polythiol and an epoxy compound; and polythiols having a triazine backbone, such as 2,4,6-trimercapto-1,3,5-triazine (thiocyanuric acid), 2-di-n-butylamino-4,6-dimercapto-s-triazine (melting point: 137° C. or higher), 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilide-4,6-mercaptotriazine and 1-phenylamino-3,5-dimercaptotriazine.

Among them, polythiols which are solid at normal temperature (30° C.) and have a melting point of preferably 120° C. or higher are suitably used because such a property can be imparted to the cohesive/adhesive layer that it is hard to leak out from an adhered region even when heated. Preferred specific examples of the polythiol which is solid at normal temperature include 2,4,6-trimercapto-1,3,5-triazine (melting point: 300° C. or higher) and 2-di-n-butylamino-4,6-dimercapto-s-triazine (melting point: 137 to 140° C.). Further, for example, when a solid polythiol having a low melting point, such as 2-di-n-butylamino-4,6-dimercapto-s-triazine is used, such an advantage can be obtained that reactivity at the time of curing the cohesive/adhesive layer is improved.

As a commercial product of the polythiol, for example, TSH (manufactured by Kawaguchi Chemical Industry Company, Limited), ZISNET DB (manufactured by SANKYO KASEI Co., Ltd.), ZISNET AF (manufactured by SANKYO KASEI Co., Ltd.) or the like can be used.

In the cohesive/adhesive layer of the reinforcing material of the present invention, the content of the polythiol is not particularly limited, but it is, for example, 0.01 to 85% by mass, preferably 0.1 to 65% by mass based on the total mass of the cohesive/adhesive layer.

In the cohesive/adhesive layer of the reinforcing material of the present invention, the ratios among the epoxy resin, aliphatic polyamide and polythiol described above may be appropriately set within a range that satisfies the contents of the components described above, but for improving the adhesion force after permanent adhesion (heat treatment or heat/pressure-bonding treatment), durability and the like while keeping the initial adhesion force proper, it is desired to set the following satisfying range: the content of the aliphatic polyamide is 10 to 100 parts by weight, preferably 25 to 50 parts by weight based on 100 parts by weight of the epoxy resin; and the content of the polythiol is 0.4 to 1.2 equivalents, preferably 0.5 to 1.0 equivalent based on 1 equivalent of the epoxy groups of the epoxy resin.

The cohesive/adhesive layer of the reinforcing material of the present invention may contain, in addition to the epoxy resin, aliphatic polyamide and polythiol described above, an ionic liquid as required for adjusting the adhesion force. The ionic liquid acts as a curing accelerator for the polythiol to shorten the curing time of the cohesive/adhesive layer of the reinforcing material of the present invention, can impart good adhesiveness in temporary adhesion before permanent adhesion (heat treatment or heat/pressure treatment) even at a relatively low temperature, and can further improve the adhesion strength after curing. Among electrolyte membranes, a hydrocarbon-based polymer electrolyte membrane is a material which is difficult to impart a proper adhesion force in temporary fixation before permanent adhesion (heat treatment or heat/pressure treatment), makes it hard to fix the position of reinforcing material at the time of temporary fixation, and tends to be positionally displaced. However, when an ionic liquid is contained in the cohesive/adhesive layer of the reinforcing material of the present invention, defects associated with the use of such a hydrocarbon-based polymer electrolyte membrane as an adherend can be eliminated, and the adhesion force after permanent adhesion (heat treatment or heat/pressure treatment), durability and the like can be improved while the initial adhesion force to the hydrocarbon-based polymer electrolyte membrane is kept proper.

The ionic liquid refers to a molten salt having a melting point of 150° C. or lower and exhibiting a liquid state at room temperature (about 25° C.), and is an ionic compound also referred to as a low-melting-point molten salt. The ionic liquid generally retains a liquid state at a temperature ranging from −30° C. to 300° C. (inclusive), has an extremely low vapor pressure, and has such properties as non-volatility and low viscosity.

In the present invention, the types of a cation and an anion that form an ionic liquid and a combination thereof are not particularly limited, and a cation that can form an ionic liquid and an anion as a counter ion of the cation may be appropriately set.

Specific examples of the cation that forms an ionic liquid include imidazolium-based cations (cations having an imidazolium backbone), pyridinium-based cations (cations having a pyridinium backbone), aliphatic amine-based cations, cycloaliphatic amine-based cations and aliphatic phosphonium-based cations. Examples of the imidazolium-based cation include, as cations, 1-methyl-3-methylimidazolium, 1-butyl-3-methylimidazolium, 1-hexyl-3-methylimidazolium, 1-octyl-3-methylimidazolium, 1-octadecyl-3-methylimidazolium, 1-methyl-2,3-dimethylimidazolium, 1-butyl-2,3-dimethylimidazolium, 1-hexyl-2,3-dimethylimidazolium, 1-octyl-2,3-dimethylimidazolium and 1-octadecyl-2,3-dimethylimidazolium. Examples of the pyridinium-based cation include 1-methylpyridinium, 1-butylpyridinium, 1-hexylpyridinium, 1-octyl-1-pyridinium, 1-butyl-3-methyl-pyridinium, 1-butyl-4-methyl-pyridinium, 1-hexyl-4-methyl-pyridinium and 1-octyl-4-methylpyridinium. Examples of the aliphatic amine cation include tetrabutylammonium, tetrapentylammonium, trioctylmethylammonium, trimethylhexylammonium, trimethylpropylammonium, N,N-dimethyl-N,N-didecylammonium, N,N-diallyl-N-hexyl-N-methylammonium and trimethylethylammonium. Examples of the cycloaliphatic amine cation include 1-methyl-1-butylpiperidinium, 1-methyl-1-ethylpyrro lidinium, 1-methyl-1-butylpyrrolidinium, 4-methyl-4-hexylmorpholinium, 1-methyl-1-ethylpiperidinium and 4-methyl-4-ethylmorpholinium. Examples of the aliphatic phosphonium-based cation include tetrabutylphosphonium, triisobutylmethylphosphonium, tetrapentylphosphonium and tetrahexylphosphonium.

The anion that forms an ionic liquid is not particularly limited as long as it exhibits the nature of the ionic liquid when forming a salt with the cation, and examples thereof include halogen ions such as those of fluorine, chlorine, bromine and iodine; fluorine-based anions such as those of tetrafluoroborate, hexafluoroborate, trifluoroacetate, hexafluorophosphate and triflate; cyanate, thiocyanate, nitrate, toluenesulphonate and $(CF_3SO_2)_2N^-$.

The ionic liquid for use in the present invention is preferably a salt of an imidazolium-based cation or a pyridinium-based cation and a fluorine-based anion, further preferably a salt of an imidazolium-based cation and a fluorine-based anion, especially preferably 1-butyl-3-methyl-pyridinium (1-butyl-3-methyl-pyridinium).

When the ionic liquid is contained in the cohesive/adhesive layer of the reinforcing material of the present invention, the content thereof is not particularly limited, but it is, for example, 0.01 to 10% by mass, preferably 0.05 to 7.5% by mass based on the total mass of the cohesive/adhesive layer. When the above-described content is satisfied, it becomes possible to shorten the curing time of the cohesive/adhesive layer, impart good adhesiveness at the time of temporary fixation under a relatively low temperature condition, improve the adhesion strength after curing, and so on.

When the ionic liquid is contained in the cohesive/adhesive layer of the reinforcing material of the present invention, the ratio of the ionic liquid to the epoxy resin may be appropriately set within a range that satisfies the contents of the components described above, but for improving the adhesion force after permanent adhesion (heat treatment or heat/pressure-bonding treatment), durability and the like while keeping the initial adhesion force proper, the content of ionic liquid is 0.01 to 20 parts by mass, preferably 0.1 to 10 parts by mass based on 100 parts by weight of the epoxy resin.

The cohesive/adhesive layer of the reinforcing material of the present invention may contain other compounding components as required within the bounds of not hindering the effect of the present invention. Specifically, for adjustment of adhesiveness, impartation of flexibility, adjustment of curing conditions, and so on, resins such as a polyimide resin, an acrylic resin, an α-olefin resin, a urethane resin, an ethylene-vinyl acetate resin, a vinyl chloride resin, a silicone resin, a styrene-butadiene resin, a polyvinyl pyrrolidone resin and a polymethacrylate resin; curing agents other than polythiols; crosslinkers; curing accelerators; curing retardants; antioxidants; pigments; dyes; antistatic agents; and the like may be contained. For example, when a curing accelerator is contained, curing of the cohesive/adhesive layer can be accelerated during permanent adhesion by heat treatment or heat/pressure-bonding treatment, and when a curing retardant is contained, curing of the cohesive/adhesive layer before permanent adhesion by heat treatment or heat/pressure-bonding treatment can be suppressed.

In the reinforcing material of the present invention, the thickness of the cohesive/adhesive layer to be laminated is not particularly limited, but is normally 1 to 300 μm, preferably 5 to 50 μm for imparting a sufficient adhesion force after permanent adhesion (heat treatment or heat/pressure-bonding treatment) while having a proper initial adhesion force.

In the reinforcing material of the present invention, when the substrate and the adherend are adhered to each other, the cohesive/adhesive layer is desired to satisfy a T-peel strength of 0.01 to 0.3 N/mm before the layer is cured and more than 0.35 N/mm after the layer is cured by performing a heating treatment at 100° C. for 6 hours; preferably 0.01 to 0.2 N/mm before the layer is cured and 0.5 N/mm or more after the layer is cured by performing a heating treatment at 100° C. for 6 hours. Here, the T-peel strength is an adhesion force as measured by adhering a strip-shaped reinforcing material having a width of 15 mm to an adherend, and pulling the adherend and the substrate of the reinforcing material at a rate of 50 mm/minute in a T shape. Considering that the reinforcing material of the present invention is suitably used as a reinforcing material for a catalyst layer laminated membrane or a membrane-electrode assembly, the above-described T-peel strength is desired to be satisfied when the adherend is an electrolyte membrane.

The method for laminating the cohesive/adhesive layer on the reinforcing material of the present invention is not particularly limited, and a previously known method can be used. For example, a coating liquid of a cohesive/adhesive composition is obtained by dissolving or dispersing compounding components of the cohesive/adhesive layer in an organic solvent. By applying the coating liquid thus obtained directly to the substrate, and drying the applied liquid, the cohesive/adhesive layer can be laminated on the substrate, or by applying the coating liquid to a peelable protective film so as to achieve a desired film thickness, and drying the applied liquid, followed by transferring to the substrate the cohesive/adhesive layer formed on the protective film, the cohesive/adhesive layer can be laminated on the substrate. Here, the organic solvent to be used for the coating liquid is not particularly limited, and examples thereof include ketones such as methyl ethyl ketone, methyl amyl ketone, methyl isobutyl ketone, cyclohexane and 3-heptanone; aromatic hydrocarbons such as toluene and xylene; glycol ethers such as ethylene glycol monomethyl ether, ethylene glycol monoethyl ether, ethylene glycol mono-n-propyl ether and ethylene glycol mono-n-butyl ether; esters such as ethyl acetate, n-butyl acetate, isobutyl acetate, amyl acetate, propionic ethyl, propyl propionate, butyl propionate, methyl butyrate, ethyl butyrate, propyl butyrate and butyl butyrate; alcohols such as ethanol, propanol, isopropyl alcohol, butanol, 3-methoxybutanol, cyclohexanol, ethylene glycol and glycerin; and mixed liquids thereof. The method for applying the coating liquid onto the substrate or the protective film is not particularly limited, and examples thereof include a roll coating method, a gravure coating method, a reverse coating method, a spray coating method, a blade coating method, a knife coating method, a curtain coating method, a die coating method, a comma coating method and a screen coating method. The protective film is not particularly limited as long as a surface in contact with the cohesive/adhesive layer has peelability, and examples thereof include plastic films having peelability by themselves, such as polyester films such as those of polyethylene terephthalate, polyethylene naphthalate and polybutylene terephthalate, polyethylene films, polypropylene films, polyarylate films, fluororesin films, diacetyl cellulose films, triacetyl cellulose films and acetyl cellulose butyrate films, or plastic films obtained by subjecting the aforementioned films to a peelability imparting treatment; and paper subjected to a peelability imparting treatment, such as polyethylene laminate paper, polypropylene laminate paper, glassine paper, resin coated paper and clay coated paper. The peelability imparting treatment is a treatment to form a peelable layer of a fluorine-based resin, a silicone-based resin, an alkyd-based resin or the like, which has peelability. For transferring to the substrate the cohesive/adhesive layer formed on the protective film, the cohesive/adhesive layer on the protective film may be laminated to a predetermined area of the substrate and pressure-bonded thereto, followed by peeling and removing the protective film.

[Use of Reinforcing Material and Method for Adhesion Thereof]

The reinforcing material of the present invention is used, regardless of the ingredient, for the purpose of reinforcing the strength of various adherend such as an electrolyte membrane, a catalyst layer, a gas diffusion layer, a gasket and a seal material. In particular, the reinforcing material of the present invention is suitably used as a reinforcing material for a catalyst layer laminated membrane or a membrane-electrode assembly.

The reinforcing material of the present invention can be adhered to an adherend by permanent adhesion (heat treatment or heat/pressure treatment). Specifically, the cohesive/adhesive layer of the reinforcing material of the present invention is bonded to an adherend to be temporarily fixed, and then cured by performing a heat treatment at about 80 to 120° C. for about 1 to 10 hours, whereby the reinforcing material of the present invention and the adherend can be strongly adhered to each other. Since adhesiveness is deteriorated when air is entrained between the reinforcing material and the adherend, air bleeding may be performed at about 50 to 100° C. for 1 to 10 minutes before the heating treatment. A pressure may be applied while the heat treatment is performed. The condition for pressure application may be about 0.01 mPa to 10 mPa, and is preferably 0.05 mPa to 1 mPa. Pressure application can be performed using a vacuum press machine or the like.

The reinforcing material of the present invention is particularly suitable for an integral molding method by vacuum molding because the reinforcing material can be pressure-bonded to an adherend with a low pressure before curing of the cohesive/adhesive layer, and good adhesiveness and cohesiveness can be achieved by subsequent low-temperature and short-time curing.

2. Catalyst Layer Laminated Membrane Equipped with Reinforcing Material

The catalyst layer laminated membrane equipped with a reinforcing material according to the present invention includes a catalyst layer laminated membrane including catalyst layers formed on both surfaces of an electrolyte membrane, and the reinforcing material, wherein the reinforcing material is adhered on the outer peripheral edge of at least one of the surfaces of the catalyst layer laminated membrane with a cohesive/adhesive layer of the reinforcing material interposed therebetween.

Figure 3:
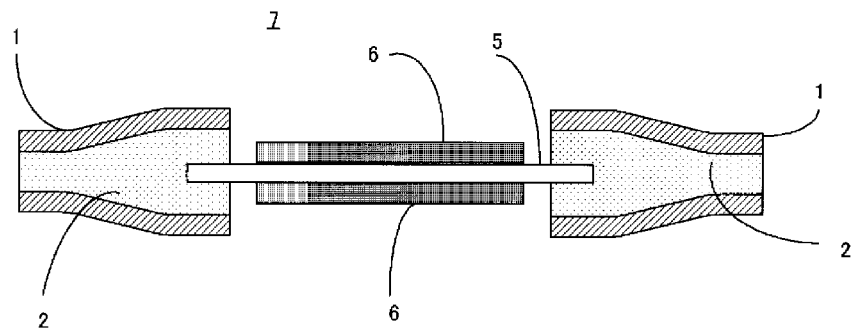
FIG. 3 shows one example of a sectional view of a catalyst layer laminated membrane equipped with a reinforcing material according to the present invention with a frame-shaped reinforcing material adhered to only the outer peripheral edge of an electrolyte membrane of a catalyst layer laminated membrane in which the catalyst layer is one size smaller than the electrolyte membrane.
Figure 4:
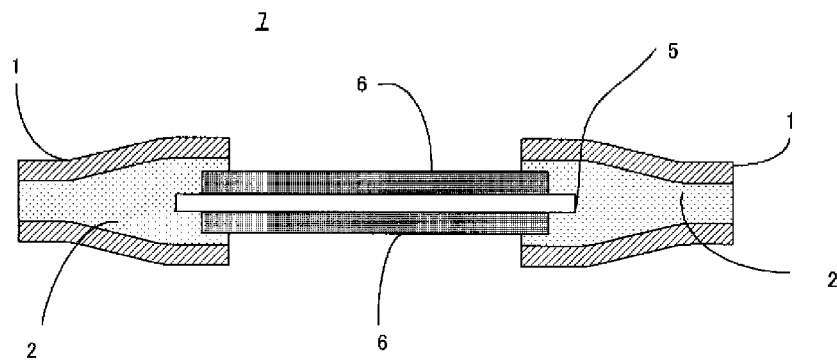
FIG. 4 shows one example of a sectional view of a catalyst layer laminated membrane equipped with a reinforcing material according to the present invention with a frame-shaped reinforcing material adhered to the outer peripheral edge of an electrolyte membrane and the outer peripheral edge of a catalyst layer of a catalyst layer laminated membrane in which the catalyst layer is one size smaller than the electrolyte membrane.
Figure 5:
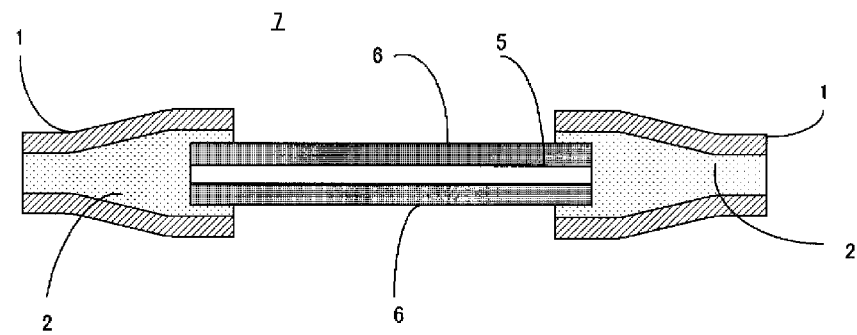
FIG. 5 shows one example of a sectional view of a catalyst layer laminated membrane equipped with a reinforcing material according to the present invention with a frame-shaped reinforcing material adhered to the outer peripheral edge of a catalyst layer of a catalyst layer laminated membrane in which the catalyst layer and the electrolyte membrane have the same size.

For the catalyst layer laminated membrane equipped with a reinforcing material according to the present invention, the outer peripheral edge of the catalyst layer laminated membrane should be adhered to the reinforcing material with the cohesive/adhesive layer thereof interposed therebetween, and the adhered region is not particularly limited. For example, when a catalyst layer one size smaller than an electrolyte membrane is formed on the electrolyte membrane, the adhered region with the reinforcing material may be formed only of the outer peripheral edge of the electrolyte membrane like the catalyst layer laminated membrane equipped with a reinforcing material as shown in FIG. 3, or the adhered region with the reinforcing material may be formed of the outer peripheral edge of the electrolyte membrane and the outer peripheral edge of the catalyst layer like the catalyst layer laminated membrane equipped with a reinforcing material as shown FIG. 4. For example, when a catalyst layer having the same size as that of an electrolyte membrane is formed on the electrolyte membrane, the adhered region with the reinforcing material may be formed of the outer peripheral edge of the catalyst layer like the catalyst layer laminated membrane equipped with a reinforcing material as shown in FIG. 5.

The catalyst layer laminated membrane equipped with a reinforcing material according to the present invention has the reinforcing material adhered on the outer peripheral edge of at least one of the surfaces, preferably the outer peripheral edges of both surfaces, of the catalyst layer laminated membrane with the cohesive/adhesive layer of the reinforcing material interposed therebetween. When the reinforcing material is adhered to the outer peripheral edges of both surfaces of the catalyst layer laminated membrane in the catalyst layer laminated membrane equipped with a reinforcing material according to the present invention, an outer peripheral side surface of the electrolyte membrane of the catalyst layer laminated membrane is preferably sealed with two reinforcing materials as shown in FIGS. 3 and 4, but the outer peripheral side surface does not have to be sealed.

In the catalyst layer laminated membrane equipped with a reinforcing material according to the present invention, a surface of the reinforcing material (a surface which is not adhered to the outer peripheral edge of the catalyst layer laminated membrane) may be provided with an adhesive layer for adhering a separator or a gasket. The adhesive layer may have a composition identical to or different from that of the cohesive/adhesive layer that is used for adhesion of the reinforcing material to the outer peripheral edge of the catalyst layer laminated membrane.

Elements that form the catalyst layer laminated membrane equipped with a reinforcing material according to the present invention will be described below.

[Electrolyte Membrane]

The electrolyte membrane is not limited as to its composition as long as it has proton conductivity, and the electrolyte membrane should be capable of being used in a polymer electrolyte fuel cell.

The electrolyte membrane has a function to selectively permeate protons generated in an anode catalyst layer to a cathode catalyst layer along the film thickness direction. The electrolyte membrane also has a function as a barrier wall for preventing mixing of a fuel gas supplied to an anode side and an oxidant gas supplied to a cathode side. The specific configuration of the electrolyte membrane is not particularly limited, and a film formed of a polymer electrolyte, which has been previously known in the art of fuel cells, can be appropriately employed. As the polymer electrolyte membrane, for example, a fluorine-based polymer electrolyte membrane formed of a perfluorocarbon sulfonic acid-based polymer, such as Nafion (registered trademark, manufactured by Du Pont Company), Aciplex (registered trademark, manufactured by Asahi Kasei Corporation), Flemion (registered trademark, manufactured by ASAHI GLASS CO., LTD.) or Gore Select (registered trademark, manufactured by W. L. Gore & Associates, Inc.); a hydrocarbon-based polymer electrolyte membrane; or the like can be used. The film thickness of the electrolyte membrane is normally about 5 to 250 µm, preferably about 10 to 80 µm.

[Catalyst Layer]

The catalyst layer is a layer in which a cell reaction actually proceeds. Specifically, an oxidation reaction of hydrogen proceeds in an anode catalyst layer and a reduction reaction of oxygen proceeds in a cathode catalyst layer. The catalyst layer contains catalyst components, and is desired to further contain a conductive catalyst carrier for carrying the catalyst component, and a polymer electrolytic binder as required.

The catalyst component to be used for the anode catalyst layer is not particularly limited as long as it has a catalytic action in the oxidation reaction of hydrogen, and a known catalyst component can be used. The catalyst component to be used for the cathode catalyst layer is not particularly limited as long as it has a catalytic action in the reduction reaction of oxygen, and a known catalyst component can be used. Specific examples of the catalyst component include metals such as platinum, ruthenium, iridium, rhodium, palladium, osmium, tungsten, lead, iron, chromium, cobalt, nickel, manganese, vanadium, molybdenum, gallium and aluminum, and alloys thereof; carbon catalysts such as nitrogen-containing carbon; and metal oxides such as molybdenum oxide and titanium oxide. Among them, those containing at least platinum are preferable for improving catalytic activity, poisoning resistance to carbon monoxide and the like, heat resistance, and so on.

The catalyst carrier functions as a carrier for carrying the catalyst component, and an electron conducting path involved in transfer of electrons between the catalyst component and other members. The catalyst carrier should be one having a specific surface area for the catalyst component to be carried in a desired dispersed state, and having sufficient electron conductivity, and is preferably mainly composed of carbon. Specific examples of the catalyst carrier include carbon particles such as those of carbon black, activated carbon, coke, natural graphite and artificial graphite.

The polymer electrolytic binder improves adhesiveness of the catalyst layer and the electrolyte membrane, and functions as a proton conducting path involved in transfer of protons between the catalyst component and other members. The polymer electrolytic binder has a polar group such as a hydroxyl group, and the polar group contributes to improvement of the adhesion force to the cohesive/adhesive layer of the reinforcing material of the present invention. For the polymer electrolytic binder, the same material as that used for the above-described electrolyte membrane can be used.

The film thickness of the catalyst layer is normally 1 to 100 μm, preferably 5 to 30 μm.

[Method for Formation of Catalyst Layer Laminated Membrane]

Catalyst layers are laminated in a desired shape on both surfaces of the electrolyte membrane excepting the outer peripheral edge, so that a catalyst layer laminated membrane is formed. The method for laminating a catalyst layer on an electrolyte membrane is not particularly limited, and a previously known method can be used. Examples thereof include a method in which a catalyst layer is applied onto an electrolyte membrane by a dry coating method such as an electrostatic screen method or a spray coating method to form a catalyst layer laminated membrane; and a method in which a catalyst transfer film having a desired shape is arranged on an electrolyte membrane to form a catalyst layer laminated membrane by a transfer method.

The catalyst transfer film to be used in the transfer method is a film having a two-layer structure with a catalyst layer formed on a transfer film. The transfer film to be used for the catalyst transfer film is not particularly limited as long as a catalyst layer can be laminated and a surface in contact with the catalyst layer has peelability, and specifically, one similar to the protective film described in the foregoing section "1. Reinforcing Material" is used. For transferring to the electrolyte membrane the catalyst layer formed on the transfer film, the catalyst transfer film may be bonded to a predetermined area of the electrolyte membrane and heat/pressure-treated, followed by peeling and removing the transfer film.

The method for adhering the reinforcing material to the outer peripheral edge of the catalyst layer laminated membrane with the cohesive/adhesive layer of the reinforcing material interposed therebetween is as described in the foregoing section "1. Reinforcing Material".

[Method for Production of Catalyst Layer Laminated Membrane Equipped with Reinforcing Material]

The method for production of the catalyst layer laminated membrane equipped with a reinforcing material according to the present invention is not particularly limited, and for example, a catalyst layer laminated membrane may be formed, followed by adhering the reinforcing material on the outer peripheral edge of the catalyst layer laminated membrane, or the reinforcing material may be adhered on an electrolyte membrane, followed by laminating a catalyst layer to the electrolyte membrane equipped with the reinforcing material.

One preferred example of the method for production of the catalyst layer laminated membrane equipped with a reinforcing material according to the present invention is a method including the steps of:

(i) adhering the reinforcing material, which is in the shape of a frame having an opening, to the outer peripheral edge of an electrolyte membrane with the cohesive/adhesive layer of the reinforcing material interposed therebetween, thereby obtaining an electrolyte membrane equipped with a reinforcing material; and (ii) laminating a catalyst layer to the electrolyte membrane exposed from the opening in the electrolyte membrane equipped with a reinforcing material, thereby obtaining a catalyst layer laminated membrane equipped with a reinforcing material.

Particularly, when one that is solid at normal temperature (30° C.) is used as a polythiol, in the cohesive/adhesive layer of the reinforcing material, the problem of the prior art that the cohesive/adhesive layer leaks out from an adhered region (outer peripheral edge of the catalyst layer laminated membrane) is eliminated even when the cohesive/adhesive layer is exposed to severe heat/pressure conditions, and therefore such an advantage is obtained that a catalyst layer laminated membrane equipped with a reinforcing material can be efficiently produced even by a production method in which an electrolyte and the reinforcing material are adhered to each other, followed by laminating a catalyst layer. Considering such an advantage, it is preferable that the cohesive/adhesive layer of the reinforcing material to be used contains a polythiol that is solid at normal temperature in the production method including the steps (i) and (ii).

According to the production method including the above-described steps, a catalyst layer laminated membrane equipped with a reinforcing material, which has a structure shown in FIG. 3, is produced.

3. Membrane-Electrode Assembly Equipped with Reinforcing Material

The membrane-electrode assembly equipped with a reinforcing material according to the present invention includes a membrane-electrode assembly including an electrolyte membrane and catalyst layers and gas diffusion layers sequentially laminated on both surfaces of the electrolyte membrane, and the reinforcing material, wherein the reinforcing material is adhered on the outer peripheral edge of at least one of the surfaces of the membrane-electrode assembly with a cohesive/adhesive layer of the reinforcing material interposed therebetween.

For the membrane-electrode assembly equipped with a reinforcing material according to the present invention, the outer peripheral edge of the membrane-electrode assembly should be adhered to the reinforcing material with the adhesive layer thereof interposed therebetween, and the adhered region is not particularly limited.

Figure 6:
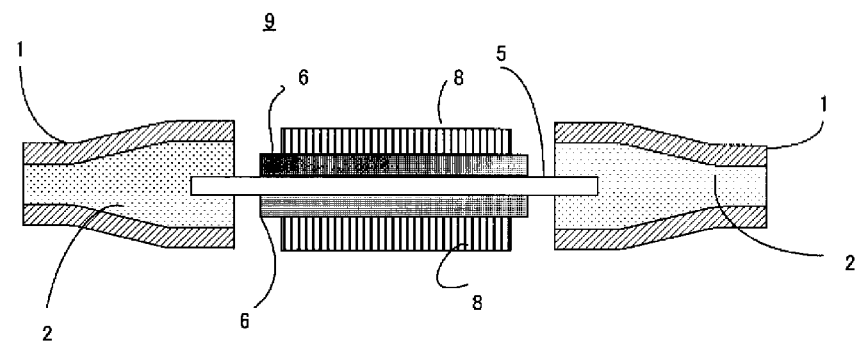
FIG. 6 shows one example of a sectional view of a membrane-electrode assembly equipped with a reinforcing material according to the present invention with a frame-shaped reinforcing material adhered to only the outer peripheral edge of an electrolyte membrane of a membrane-electrode assembly in which the gas diffusion layer is one size smaller than the catalyst layer and the catalyst layer is one size smaller than the electrolyte membrane.
Figure 7:
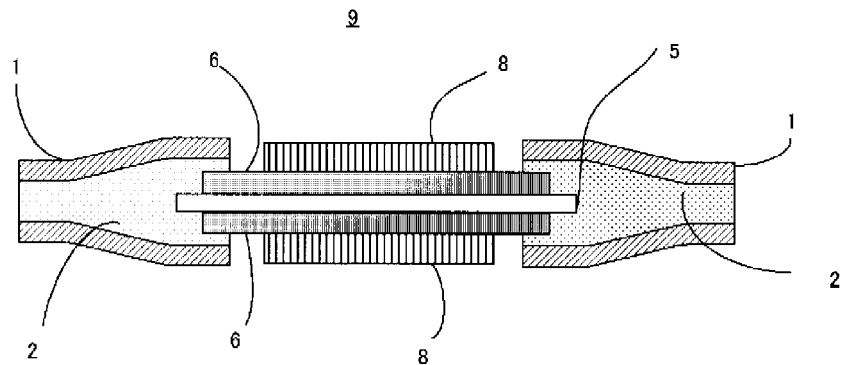
FIG. 7 shows one example of a sectional view of a membrane-electrode assembly equipped with a reinforcing material according to the present invention with a frame-shaped reinforcing material adhered to the outer peripheral edge of an electrolyte membrane and the outer peripheral edge of a catalyst layer of a membrane-electrode assembly in which the gas diffusion layer is one size smaller than the catalyst layer and the catalyst layer is one size smaller than the electrolyte membrane.
Figure 8:
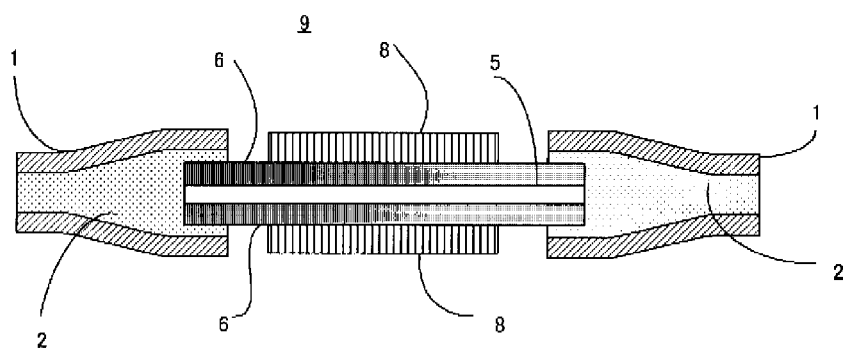
FIG. 8 shows one example of a sectional view of a membrane-electrode assembly equipped with a reinforcing material according to the present invention with a frame-shaped reinforcing material adhered to the outer peripheral edge of a catalyst layer of a membrane-electrode assembly in which the gas diffusion layer is one size smaller than the catalyst layer and the catalyst layer and the electrolyte membrane have the same size.

For example, as shown in FIGS. 6 to 8, the membrane-electrode assembly equipped with a reinforcing material according to the present invention may be in a state where the outer peripheral edge of a gas diffusion layer of a membrane-electrode assembly is not incorporated in the adhered region (i.e. a state where a gas diffusion layer is formed on each catalyst layer of the catalyst layer laminated membrane equipped with a reinforcing material). For the membrane-electrode assembly shown in FIG. 6, a membrane-electrode assembly, in which the gas diffusion layer is one size smaller than the catalyst layer and the catalyst layer is one size smaller than the electrolyte membrane, is used, and a frame-shaped reinforcing sheet is adhered to only the outer peripheral edge of the electrolyte membrane of the membrane-electrode assembly. For the membrane-electrode assembly shown in FIG. 7, a membrane-electrode assembly, in which the gas diffusion layer is one size smaller than the catalyst layer and the catalyst layer is one size smaller than the electrolyte membrane, is used, and a frame-shaped reinforcing material is adhered to the outer peripheral edge of the electrolyte membrane and the outer peripheral edge of the catalyst layer of the membrane-electrode assembly. For the membrane-electrode assembly shown in FIG. 8, a membrane-electrode assembly, in which the gas diffusion layer is one size smaller than the catalyst layer and the catalyst layer and the electrolyte membrane have the same size, is used, and a frame-shaped reinforcing material is adhered to the outer peripheral edge of the catalyst layer of the membrane-electrode assembly.

Figure 9:
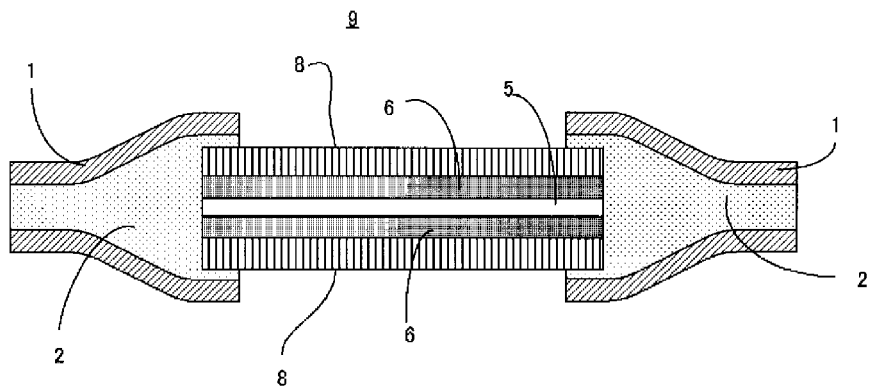
FIG. 9 shows one example of a sectional view of a membrane-electrode assembly equipped with a reinforcing material according to the present invention with a frame-shaped reinforcing material adhered to the outer peripheral edge of a gas diffusion layer of a membrane-electrode assembly in which the catalyst layer, the electrolyte membrane and the gas diffusion layer have the same size.
Figure 10:
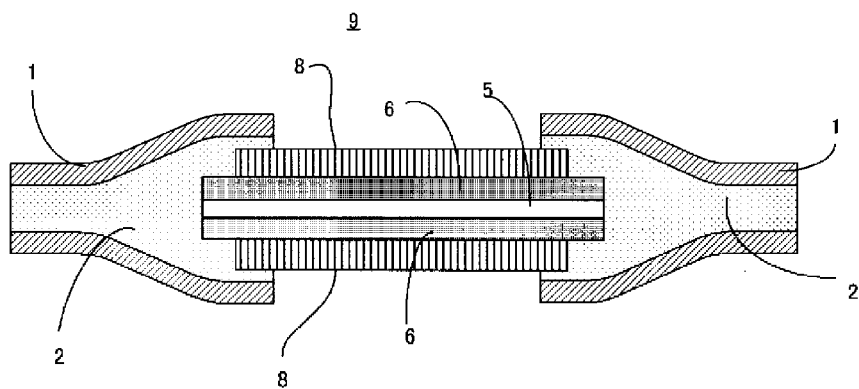
FIG. 10 shows one example of a sectional view of a membrane-electrode assembly equipped with a reinforcing material according to the present invention with a frame-shaped reinforcing material adhered to the outer peripheral edge of a gas diffusion layer and the outer peripheral edge of a catalyst layer of a membrane-electrode assembly in which the catalyst layer and the electrolyte membrane have the same size and the gas diffusion layer is one size smaller than the catalyst layer.
Figure 11:
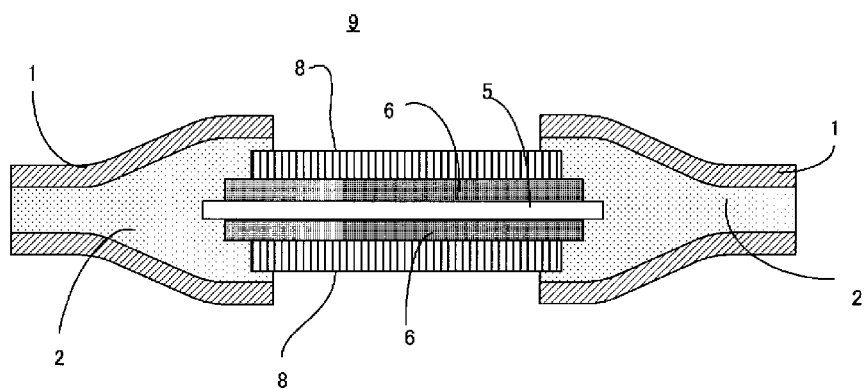
FIG. 11 shows one example of a sectional view of a membrane-electrode assembly equipped with a reinforcing material according to the present invention with a frame-shaped reinforcing material adhered to the outer peripheral edge of an electrolyte membrane, the outer peripheral edge of a gas diffusion layer and the outer peripheral edge of a catalyst layer of a membrane-electrode assembly in which the catalyst layer is one size smaller than the electrolyte membrane and the gas diffusion layer is one size smaller than the catalyst layer.

Further, for example, as shown in FIGS. 9 to 11, the membrane-electrode assembly equipped with a reinforcing material according to the present invention may be in a state where the outer peripheral edge of a gas diffusion layer of a membrane-electrode assembly is incorporated in the adhered region, and the adhered region is formed only of the outer peripheral edge of the gas diffusion layer (FIG. 9), a state where the adhered region is formed of the outer peripheral edge of a gas diffusion layer and the outer peripheral edge of a catalyst layer (FIG. 10), or a state where the adhered region is formed of the outer peripheral edge of a gas diffusion layer, the outer peripheral edge of a catalyst layer and the outer peripheral edge of an electrolyte membrane (FIG. 11). For the membrane-electrode assembly shown in FIG. 9, a membrane-electrode assembly, in which the catalyst layer, the electrolyte membrane and the gas diffusion layer have the same size, is used, and a frame-shaped reinforcing material is adhered to the outer peripheral edge of the gas diffusion layer of the membrane-electrode assembly. For the membrane-electrode assembly shown in FIG. 10, a membrane-electrode assembly, in which the catalyst layer and the electrolyte membrane have the same size and the gas diffusion layer is one size smaller than the catalyst layer, is used, and a frame-shaped reinforcing material is adhered to the outer peripheral edge of the gas diffusion layer and the outer peripheral edge of the catalyst layer of the membrane-electrode assembly. For the membrane-electrode assembly shown in FIG. 11, a membrane-electrode assembly, in which the catalyst layer is one size smaller than the electrolyte membrane and the gas diffusion layer is one size smaller than the catalyst layer, is used, and a frame-shaped reinforcing material is adhered to the outer peripheral edge of the electrolyte membrane, the outer peripheral edge of the gas diffusion layer and the outer peripheral edge of the catalyst layer of the membrane-electrode assembly.

The membrane-electrode assembly equipped with a reinforcing material according to the present invention has the reinforcing material adhered on the outer peripheral edge of at least one of the surfaces, preferably the outer peripheral edges of both surfaces, of the membrane-electrode assembly with the cohesive/adhesive layer of the reinforcing material interposed therebetween. When the reinforcing material is adhered to the outer peripheral edges of both surfaces of the membrane-electrode assembly in the membrane-electrode assembly equipped with a reinforcing material according to the present invention, an outer peripheral side surface of the electrolyte membrane of the membrane-electrode assembly is preferably sealed with two reinforcing materials as shown in FIGS. 6 to 11, but the outer peripheral side surface does not have to be sealed.

In the membrane-electrode assembly equipped with a reinforcing material according to the present invention, a surface of the reinforcing material (a surface which is not adhered to the outer peripheral edge of the membrane-electrode assembly) may be provided with an adhesive layer for adhering a separator or a gasket. The adhesive layer may have a composition identical to or different from that of the cohesive/adhesive layer that is used for adhesion of the reinforcing material to the outer peripheral edge of the membrane-electrode assembly.

Elements that form the membrane-electrode assembly equipped with a reinforcing material according to the present invention will be described below.

[Gas Diffusion Layer]

For the gas diffusion layer, various kinds of conductive porous substrates that form an anode (fuel electrode) and a cathode (air electrode) can be used, and it is desired to use a porous conductive substrate for efficiently supplying a fuel gas and an oxidant gas, as a fuel, to a catalyst layer. Examples of the porous conductive substrate include carbon paper and a carbon cloth.

The gas diffusion layer may contain a polymer electrolytic binder as required. The polymer electrolytic binder has a polar group such as a hydroxyl group, and the polar group can improve the adhesion force to the cohesive/adhesive layer of the reinforcing material. For the polymer electrolytic binder, the same material as that used for the above-described electrolyte membrane can be used.

The film thickness of the gas diffusion layer is normally 20 to 1000 μm, preferably 30 to 400 μm.

[Method for Formation of Membrane-Electrode Assembly]

The method for forming a membrane-electrode assembly is not particularly limited, and a previously known method can be used. Examples thereof include a method in which a gas diffusion layer is arranged on a catalyst layer of a catalyst layer laminated membrane and bonded thereto by heat/pressure bonding to form a membrane-electrode assembly; and a method in which a film for transfer of a two-layer structure of a catalyst layer and a gas diffusion layer is arranged on an electrolyte membrane to form a membrane-electrode assembly by a transfer method.

The two-layer structure transfer film to be used in the transfer method includes a transfer film on which a two-layer structure composed of a gas diffusion layer and a catalyst layer is laminated. The transfer film to be used for the catalyst transfer film is not particularly limited as long as a gas diffusion layer can be laminated and a surface in contact with the gas diffusion layer has peelability, and specifically one similar to the protective film described in the foregoing section "1. Reinforcing Material" is used. For sequentially forming a gas diffusion layer and a catalyst layer on a transfer film, the layers may be sequentially laminated by a dry coating method such as an electrostatic screen method, a spray coating method or a transfer method. For transferring to the electrolyte membrane the catalyst layer and gas diffusion layer formed on the transfer film, the catalyst layer/gas diffusion layer transfer film may be bonded to a predetermined area of the electrolyte membrane and heat/pressure-bonded thereto, followed by peeling and removing the transfer film.

[Method for Production of Membrane-Electrode Assembly Equipped with Reinforcing Material]

The method for production of the membrane-electrode assembly equipped with a reinforcing material of the present invention is not particularly limited, and for example, a membrane-electrode assembly may be formed, followed by adhering the reinforcing material on the outer peripheral edge (electrolyte membrane) of the membrane-electrode assembly, or the reinforcing material may be adhered on an electrolyte membrane, followed by sequentially laminating a catalyst layer and a gas diffusion layer to the electrolyte membrane equipped with a reinforcing material.

One preferred example of the method for production of the membrane-electrode assembly equipped with a reinforcing material according to the present invention is a method including the steps of:

(i) adhering the reinforcing material (containing in a cohesive/adhesive layer a polythiol that is solid at normal temperature) which is in the shape of a frame having an opening, to the outer peripheral edge of an electrolyte membrane with the cohesive/adhesive layer of the reinforcing material interposed therebetween, thereby obtaining an electrolyte membrane equipped with a reinforcing material; and (ii) sequentially laminating a catalyst layer and a gas diffusion layer or laminating a two-layer structure composed of a catalyst layer and a gas diffusion layer to the electrolyte membrane exposed from the opening in the electrolyte membrane equipped with a reinforcing material, thereby obtaining a membrane-electrode assembly equipped with a reinforcing material.

Particularly, when one that is solid at normal temperature (30° C.) is used as a polythiol, in the cohesive/adhesive layer of the reinforcing material, the problem of the prior art that the cohesive/adhesive layer leaks out from an adhered region (outer peripheral edge of the catalyst layer laminated membrane) is eliminated even when the cohesive/adhesive layer is exposed to severe heat/pressure conditions, and therefore such an advantage is obtained that a membrane-electrode assembly equipped with a reinforcing material can be efficiently produced even by a production method in which an electrolyte and the reinforcing material are adhered to each other, followed by sequentially laminating a catalyst layer and a gas diffusion layer. Considering such an advantage, it is preferable that the cohesive/adhesive layer of the reinforcing material to be used contains a polythiol that is solid at normal temperature in the production method including the steps (i) and (ii).

According to the production method including the above-described steps, a catalyst layer laminated membrane equipped with a reinforcing material, which has a structure shown in FIG. 6, is produced.

4. Polymer Electrolyte Fuel Cell

The polymer electrolyte fuel cell of the present invention includes the above-described membrane-electrode assembly equipped with a reinforcing material.

The polymer electrolyte fuel cell of the present invention is produced by holding the membrane-electrode assembly equipped with a reinforcing material by a separator with a gasket interposed therebetween as required. When a substrate having a function as a gasket is used in the reinforcing material, the reinforcing material also serves as a gasket, and therefore the membrane-electrode assembly equipped with a reinforcing material can be held by a separator without interposing a gasket therebetween. When a substrate serving as a gasket is not used in the reinforcing material, it is desired that the membrane-electrode assembly equipped with a reinforcing material be held by a separator with a gasket interposed between the reinforcing material of the membrane-electrode assembly equipped with a reinforcing material and the separator.

The separator should be a conductive plate which is stable in an environment within a fuel cell, and generally a carbon plate provided with a gas channel is used. It is also possible to use a separator formed of a metal such as stainless steel, with the surface of the metal provided with a film formed of a conductive material such as chromium, a platinum group metals or an oxide thereof, or a conductive polymer, or a separator formed similarly of a metal, with the surface of the metal plated with a material such as a composite oxide of silver and platinum group metals or chromium nitride.

The gasket is not particularly limited as long as it has a strength that can withstand heat press, and a gas barrier property to prevent a fuel and an oxidant from leaking to the outside, and examples thereof include a polyethylene terephthalate sheet, a Teflon (registered trademark) sheet and a silicon rubber sheet.

5. Cohesive/Adhesive Composition

The cohesive/adhesive composition of the present invention contains an epoxy resin, an aliphatic polyamide and a polythiol.

The types of an epoxy resin, an aliphatic polyamide and a polythiol to be used in the cohesive/adhesive composition of the present invention are as described in the foregoing section of [Cohesive/Adhesive Layer] in "1. Reinforcing Material". The contents and ratios of these components in the cohesive/adhesive composition of the present invention are similar to the contents and ratios of the components in the cohesive/adhesive layer described in the foregoing section of [Cohesive/Adhesive Layer] in "1. Reinforcing Material".

The cohesive/adhesive composition of the present invention may contain an ionic liquid in addition to the above-described components. When the cohesive/adhesive composition of the present invention further contains an ionic liquid, it becomes possible to shorten the curing time, impart proper adhesiveness at the time of temporary fixation under a relatively low temperature condition, improve the adhesion strength after curing, and so on. Particularly, when a hydrocarbon-based electrolyte membrane is an adherend, it is preferable that the cohesive/adhesive composition of the present invention contains an ionic liquid. The type of an ionic liquid to be used in the cohesive/adhesive composition of the present invention is as described in the foregoing section "1. Reinforcing Material". The content and ratio of the ionic liquid in the cohesive/adhesive composition of the present invention are similar to the content and ratio of each component in the cohesive/adhesive layer described in the foregoing section of [Cohesive/Adhesive Layer] in "1. Reinforcing Material".

Other compounding components that can be compounded with the cohesive/adhesive composition of the present invention are as described in the foregoing section "1. Reinforcing Material".

The cohesive/adhesive composition of the present invention can be prepared as a solvent-free cohesive/adhesive composition by mixing an epoxy resin, an aliphatic polyamide, a polythiol and other compounding components as required in predetermined amounts. Alternatively, the cohesive/adhesive composition can be prepared as a cohesive/adhesive composition containing an organic solvent as required.

The organic solvent is similar to the organic solvent that is used for the coating liquid of the cohesive/adhesive composition described in the foregoing section of [Cohesive/Adhesive Layer] in "1. Reinforcing Material".

The cohesive/adhesive composition of the present invention may be used in such a manner as to be applied directly to an adherend and dried. Alternatively, a cohesive/adhesive sheet, in which a cohesive/adhesive layer formed of the cohesive/adhesive composition of the present invention is formed on a peelable protective film, may be prepared and used to transfer the cohesive/adhesive composition of the present invention to an adherend. The cohesive/adhesive sheet can be prepared by, for example, applying a coating liquid of the cohesive/adhesive composition of the present invention to a peelable protective film so as to achieve a desired film thickness, and drying the applied liquid. Here, the peelable protective film, the organic solvent compounded with the liquid cohesive/adhesive composition, the application method and so on are similar to those described in the foregoing section of [Cohesive/Adhesive Layer] of "1. Reinforcing Material".

The cohesive/adhesive composition of the present invention is desired to be adhered to an adherend in the form of a layer having a film thickness of 1 to 300 μm, preferably 5 to 50 μm.

The cohesive/adhesive composition of the present invention is suitably used as an adhesive for members that form a polymer electrolyte fuel cell, but since the cohesive/adhesive composition of the present invention exhibits good adhesiveness and cohesiveness to an adherend, and is excellent in durability, it can also be used as an adhesive for interior materials and exterior materials of automobiles, vehicles of railroads and the like, aircraft, ships and the like; fittings of window frames, door frames and the like; building interior materials of walls, floors, ceilings and the like; decorative sheets of cases and containers of household electric appliances such as televisions and air conditioners; and decorative sheets of cases of OA equipment such as personal computers. Further, the cohesive/adhesive composition of the present invention can be used as an adhesive for constituent members of various kinds of cells other than polymer electrolyte fuel cells. For example, a metal-air cell using a gas for an electrode reaction has constituent members such as a negative electrode electrolyte, a positive electrode catalyst layer, a gas diffusion layer, a separator, a support, a water repellent film, a gasket and a seal material, and the cohesive/adhesive composition of the present invention can also be used as an adhesive for adhering these constituent members to one another.

Examples of the type of the metal-air cell may include a lithium-air cell, a sodium-air cell, a potassium-air cell, a magnesium-air cell, a calcium-air cell, a zinc-air cell, an aluminum-air cell and an iron-air cell. The metal-air cell may be a primary cell, or may be secondary cell.

When the cohesive/adhesive composition of the present invention is used for adhesion of members that form a polymer electrolyte fuel cell, it is suitably applied for adhesion of at least one of an electrolyte membrane, a catalyst layer and a gas diffusion layer, which are used in the polymer electrolyte fuel cell, and a substrate to reinforce the members, particularly for adhesion of the electrolyte membrane to the substrate.

When a polythiol which is solid at normal temperature (30° C.) and has a melting point of preferably 120° C. or higher is used as a polythiol in the cohesive/adhesive composition of the present invention, the cohesive/adhesive composition can have such a property that it is hard to leak out from the adhered region even when exposed to a high-temperature condition of about 100 to 150° C. Considering such a property, the cohesive/adhesive composition of the present invention is suitably used for adhesion of an adherend, which is exposed to the high-temperature condition described above, when a polythiol that is solid at normal temperature is used.

When a cohesive/adhesive layer having a thickness of 20 μm is formed between the substrate of the reinforcing material and the electrolyte membrane, the cohesive/adhesive composition of the present invention is desired to satisfy a T-peel strength of 0.01 to 0.3 N/mm before the composition is cured and more than 0.35 N/mm after the composition is cured by performing a heating treatment at 100° C. for 6 hours; preferably 0.01 to 0.2 N/mm before the composition is cured and 0.5 N/mm or more after the composition is cured by performing a heating treatment at 100° C. for 6 hours. Here, the T-peel strength is an adhesion force as measured by adhering a strip-shaped substrate and a strip-shaped electrolyte membrane each having a width of 15 mm, and pulling the substrate and the electrolyte membrane at a rate of 50 mm/minute in a T shape.

The cohesive/adhesive composition of the present invention can adhere an adherend through heat treatment or heat/pressure treatment. Conditions for adhering an adherend using the cohesive/adhesive composition of the present invention, etc. are similar to those described in the foregoing section of [Cohesive/Adhesive Layer] in "1. Reinforcing Material".

The present invention will be described in detail below based on examples etc., but the present invention is not limited thereto.

Test Example 1

Evaluation of Ease of Temporary Fixation to Fluorine-Based Polymer Electrolyte Membrane and Occurrence of Leakage of Cohesive/Adhesive Composition 1. Preparation and Evaluation of Catalyst Layer Laminated Membrane Equipped with Reinforcing Material (1)
<Preparation of Reinforcing Material>

A cohesive/adhesive composition coating liquid of each of Examples 1 to 10 and Comparative Examples 1 and 2 shown in Tables 1 and 2 was prepared, and the coating liquid was applied onto a plastic substrate (Teonex Q51 (registered trademark, manufactured by Teijin DuPont Films Japan Limited) (thickness 25 μm, having a square opening of 51 mm×51 mm at the center of a square of 100 mm×100 mm)) by a blade coating method, and dried to prepare a reinforcing material provided with a cohesive layer having a thickness of 20 μm.

<Preparation of Catalyst Layer Laminated Membrane>

Catalyst layers 3 of 50 mm×50 mm with a layer thickness of 20 μm were formed on both surfaces of an electrolyte membrane (Nafion (registered trademark, manufactured by Du Pont Company), thickness 25 μm, 100 mm×100 mm) by a transfer method. Specifically, to 2 g of platinum catalyst carrying carbon (amount of platinum carried: 45.7 wt %, manufactured by Tanaka Kikinzoku Kogyo K.K., TEC10E50E) were added 10 g of 1-butanol, 10 g of 2-butanol, 20 g of a fluororesin (5 wt % Nafion Binder, manufactured by Du Pont Company) and 6 g of water, the mixture was stirred and mixed by a disperser to prepare a catalyst forming paste, and the paste was applied onto a polyester film (manufactured by TOYOBO CO., LTD, E5100, 25 μm) so that the weight of platinum after drying was 0.4 mg/cm$^2$, thereby obtaining a catalyst layer transfer film. Then, this catalyst layer transfer film was arranged on both surfaces of the electrolyte membrane with the centers aligned so that the catalyst layers faced the electrolyte membrane side, and heat pressing was performed at 150° C. and 5.0 MPa for 5 minutes to form catalyst layers on both surfaces of the electrolyte membrane.

<Preparation of Catalyst Layer Laminated Membrane Equipped with Reinforcing Material (1)>

The cohesive/adhesive layer of the reinforcing material was laminated to the outer periphery of the electrolyte membrane of the catalyst layer laminated membrane obtained as described above, and pressure-bonded with a finger to be temporarily fixed, and a pressure was applied at 100° C. and 0.5 MPa for 1 minute, followed by performing a heating treatment (permanent adhesion) at 100° C. for 6 hours to prepare a catalyst layer laminated membrane equipped with a reinforcing material (1).

<Evaluation Item 1: Evaluation of Degree of Leakage of Cohesive/Adhesive Composition>

The appearance of the reinforcing material after permanent adhesion was observed to measure the degree of leakage of the cohesive/adhesive composition from the interface between the reinforcing material and the electrolyte membrane (lateral spread). The degree of leakage was evaluated by measuring the length of leakage of the cohesive/adhesive composition from the reinforcing material and the electrolyte membrane (leakage length) at random 10 points, and averaging the measured values.

2. Preparation and Evaluation of Catalyst Layer Laminated Membrane Equipped with Reinforcing Material (2)

<Preparation of Electrolyte Membrane with Reinforcing Material>

The same reinforcing material as that used in the catalyst layer laminated membrane equipped with a reinforcing material (1) was laminated to both surfaces of an electrolyte membrane (Nafion (registered trademark, manufactured by Du Pont Company), thickness 25 μm, 100 mm×100 mm), and pressure-bonded with a finger to be temporarily fixed, followed by performing a heating treatment (permanent adhesion) at 100° C. for 6 hours to prepare an electrolyte membrane equipped with a reinforcing material.

<Evaluation Item 2: Evaluation of Workability in Temporary Fixation>

Workability in temporary fixation of the reinforcing material and the electrolyte membrane during preparation of the electrolyte membrane equipped with a reinforcing material was evaluated in accordance with the criteria described below.

<Workability in Temporary Fixation>

BB: The initial adhesion force in temporary fixation is excessively strong. The position cannot be corrected after bonding, and forcible peeling leads to breakage of the electrolyte membrane.

B: The initial adhesion force in temporary fixation is strong. The position can be slightly corrected after bonding, but the electrolyte membrane cannot be stretched to remove wrinkles.

A: The initial adhesion force in temporary fixation is proper. The position can be corrected after bonding, and the electrolyte membrane can be stretched to remove wrinkles of the electrolyte membrane.

C: The initial adhesion force in temporary fixation is weak, so that pressure bonding alone leads to insufficient temporary fixation. It is difficult to adjust the position of the reinforcing material and the catalyst layer at the time of heat/pressure bonding.

CC: The initial adhesion force in temporary fixation is very weak, so that temporary fixation cannot be performed by pressure bonding with a finger.

<Preparation of Catalyst Layer Laminated Membrane Equipped with Reinforcing Material (2)>

The same catalyst transfer film as that used in preparation of the catalyst layer laminated membrane equipped with a reinforcing material (1) was laminated to both surfaces of an electrolyte membrane in an electrolyte membrane equipped with a reinforcing material, and a heat/pressure treatment was performed at 150° C. and 5 MPa for 5 minutes to prepare a catalyst layer laminated membrane equipped with a reinforcing material (2).

<Evaluation Item 3: Degree of Leakage of Cohesive/Adhesive Composition>

The appearance of the catalyst layer laminated membrane equipped with a reinforcing material (2), which was obtained as described above, was observed to measure the degree of leakage of the cohesive/adhesive composition from the interface between the reinforcing material and the electrolyte membrane (lateral spread). The degree of leakage was evaluated by measuring the length of leakage of the cohesive/adhesive composition from the reinforcing material and the electrolyte membrane (leakage length) at 10 points, and averaging the measured values.

3. Results

The obtained results are collectively shown in Tables 1 and 2. As shown in Table 2, when a cohesive/adhesive composition containing a curing agent other than an epoxy resin, an aliphatic polyamide and a polythiol was used (Comparative Example 1), the initial adhesion force in temporary fixation was excessively strong, resulting in poor workability such that the position could not be corrected after bonding, and also heat/pressure bonding to laminate a catalyst layer caused the cohesive/adhesive composition to leak out from the interface between the reinforcing material and the electrolyte membrane. When a cohesive/adhesive composition, which contained an epoxy resin and a polythiol but did not contain an aliphatic polyamide, was used (Comparative Example 2), the initial adhesion force was weak, so that it was difficult to adjust the position of the reinforcing material. In contrast, as shown in Table 1, when a cohesive/adhesive composition containing an epoxy resin, an aliphatic polyamide and a polythiol was used (Examples 1 to 10), the initial adhesion force in temporary fixation was proper, the position could be corrected after bonding and the electrolyte membrane could be stretched to remove wrinkles of the electrolyte membrane in every example. Further, when as a polythiol, one that is solid at normal temperature was used (Examples 1 to 5 and 7 to 10), the cohesive/adhesive composition did not leak out from the interface between the reinforcing material and the electrolyte membrane even when subjected to a heat/pressure bonding treatment to laminate a catalyst layer, so that the adhesive layer was stably retained.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Cohesive/ adhesive composition | Resin | Aliphatic polyamide[#1] | 20 | 20 | 20 | 20 | 20 | 20 | 20 | 25 | 20 | 25 |
| | | Solid bisphenol A type epoxy resin[#2] | 50 | 50 | 50 | 50 | 50 | 50 | 50 | 50 | 50 | 50 |

TABLE 1-continued

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| coating liquid | | Flexible epoxy resin[#3] | 15 | 15 | 15 | 15 | 15 | 15 | 15 | 15 | 15 | 15 |
| | | NBNR modified epoxy resin[#4] | 10 | 10 | 10 | 10 | 10 | 10 | 10 | 10 | 10 | 10 |
| | | Polyimide resin[#5] | 5 | 5 | 5 | — | 5 | 5 | 5 | — | 5 | — |
| | Curing agent | Solid polythiol[#6] | 3.75 | 1.5 | 4.5 | 3.75 | 3.75 | — | 3.75 | 3.75 | — | — |
| | | Solid polythiol[#7] | — | — | — | — | — | — | — | — | 8.36 | 8.36 |
| | | Liquid polythiol[#8] | — | — | — | — | — | 8.5 | — | — | — | — |
| | | Epoxy adduct[#9] | — | — | — | — | 1.875 | 1.875 | 1.875 | 1.875 | 1.875 | 1.875 |
| | | Antimony-based organic sulfonium salt[#10] | | | | | | | | | | |
| | Crosslinker | Xylene diisocyanate[#11] | — | — | — | 1.5 | — | — | — | — | — | — |
| | Curing retardant | Epoxy-phenol-boric acid ester compound[#12] | — | — | — | — | — | — | 3.75 | 3.75 | 3.75 | 3.75 |
| | Dilute solution | Toluene | 120 | 120 | 120 | 120 | 120 | 120 | 30 | 30 | 30 | 30 |
| | | Methyl ethyl ketone | 30 | 30 | 30 | 30 | 30 | 30 | 120 | 120 | 120 | 120 |
| Evaluation results | Evaluation item 1 Length (mm) of leakage of cohesive/adhesive composition in catalyst layer laminated membrane equipped with reinforcing material (1) | | <0.2 | <0.2 | <0.2 | <0.2 | <0.2 | <0.2 | <0.2 | <0.2 | <0.2 | <0.2 |
| | Evaluation item 2 Workability in temporary fixation during preparation of electrolyte membrane equipped with reinforcing material | | A | A | A | A | A | A | A | A | A | A |
| | Evaluation item 3 Length (mm) of leakage of cohesive/adhesive composition in catalyst layer laminated membrane equipped with reinforcing material (2) | | <0.2 | <0.2 | <0.2 | <0.2 | <0.2 | 20 | <0.2 | <0.2 | <0.2 | <0.2 |

In the table, the unit of the content of each component contained in the cohesive/adhesive composition coating liquid is "g".

[#1] For the aliphatic polyamide, "TAPE-826-4S" (trade name) (polymerized aliphatic polyether amide block copolymer, containing a carboxyl group) (manufactured by Fuji Chemical Industry Co., Ltd.) was used.
[#2] For the solid bisphenol A type epoxy resin, "jER1001" (trade name) (glycidyl ether type, bisphenol A type) (manufactured by Japan Epoxy Resins Co., Ltd.) was used.
[#3] For the flexible epoxy resin, "jER872" (trade name) (polycondensate of bisphenol A/epichlorohydrin/dimer acid) (manufactured by Japan Epoxy Resins Co., Ltd.) was used.
[#4] For the NBNR modified epoxy resin, "EPR-4030" (trade name) (mixture of bisphenol A type epoxy resin and modified epoxy resin) (manufactured by ADEKA CORPORATION) was used.
[#5] For the polyimide resin, "PI-36" (trade name) (manufactured by Mitsubishi Gas Chemical Company, Inc.) was used.
[#6] For the solid polythiol, "TSH" (trade name) (2,4,6-trimercapto-1,3,5-triazine) (manufactured by Kawaguchi Chemical Industry Company, Limited) was used. Solid at normal temperature (melting point: 300° C. or higher).
[#7] For the solid polythiol, "Zisnet DB" (trade name) (2-n-dibutylamino-4,6-dimercapto-s-triazine) (manufactured by SANKYO KASEI Co., Ltd.) was used. Solid at normal temperature (melting point: 137 to 140° C.).
[#8] For the liquid polythiol, "Epicure QX40" (trade name) (pentaerythritol tristhiopropionic acid ester) (manufactured by Yuka Shell Epoxy K.K.) was used. Liquid at normal temperature.
[#9] For the epoxy adduct, "Amicure MY-II" (trade name) (amine adduct type) (manufactured by Ajinomoto Fine-Techno Co., Inc.) was used.
[#10] For the antimony-based organic sulfonium salt, "Sanaid SI-60" (trade name) (aromatic sulfonium salt) (manufactured by Sanshin Chemical Industry Co., Ltd.) was used.
[#11] For the xylene diisocyanate, "Takenate 500" (trade name) (XDI xylene diisocyanate) (manufactured by Mitsui Chemicals, Incorporated) was used.
[#12] For the epoxy phenol-boric acid ester compound, "Cureduct L-07N" (trade name) (manufactured by Shikoku Chemicals Corporation) was used.

TABLE 2

| | | | Comparative Examples | |
|---|---|---|---|---|
| | | | 1 | 2 |
| Cohesive/adhesive composition coating liquid | Resin | Aliphatic polyamide[#1] | 20 | — |
| | | Solid bisphenol A type epoxy resin[#2] | 50 | 50 |
| | | Flexible epoxy resin[#3] | 15 | 15 |
| | | NBNR modified epoxy resin[#4] | 10 | 10 |
| | | Polyimide resin[#5] | 5 | 5 |
| | Curing agent | Solid polythiol[#6] | — | 3.75 |
| | | Solid polythiol[#7] | — | — |
| | | Liquid polythiol[#8] | — | — |
| | | Epoxy adduct[#9] | — | — |
| | | Antimony-based organic sulfonium salt[#10] | 2.25 | — |
| | Crosslinker | Xylene diisocyanate[#11] | — | — |
| | Curing retardant | Epoxy-phenol-boric acid ester compound[#12] | — | — |
| | Dilute solution | Toluene | 120 | 120 |
| | | Methyl ethyl ketone | 30 | 30 |
| Evaluation results | Evaluation item 1 Length (mm) of leakage of cohesive/adhesive composition in catalyst layer laminated membrane equipped with reinforcing material (1) | | 5 | <0.2 |
| | Evaluation item 2 Workability in temporary fixation during preparation of electrolyte membrane equipped with reinforcing material | | BB | C |
| | Evaluation item 3 Length (mm) of leakage of cohesive/adhesive composition in catalyst layer laminated membrane equipped with reinforcing material (2) | | 20 | <0.2 |

In the table, the unit of the content of each component contained in the cohesive/adhesive composition coating liquid is "g".
The structures and sources of compounds #1 to #12 are as described in Table 1.

Test Example 2

Evaluation of T-Peel Strength to Fluorine-Based Polymer Electrolyte Membrane A reinforcing material provided with a cohesive/adhesive layer (thickness 20 μm) formed of the cohesive/adhesive composition shown in each of Examples 1 to 5 in Table 1 and Comparative Examples 1 and 2 in Table 2 was prepared using the same method as that in Test Example 1 except that a plastic substrate (Teonex Q51 (registered trademark, manufactured by Teijin DuPont Films Japan Limited) (thickness 25 μm, strip of 15 mm×50 mm) was used.

The cohesive/adhesive layer of the reinforcing material obtained as described above and an electrolyte membrane (Nafion) (registered trademark, manufactured by Du Pont Company) (thickness 25 mm, strip of 15 mm×50 mm) were brought into contact with each other, and pressure-bonded with a finger to be temporarily fixed, and a T-peel strength (before curing) was measured. Then, a pressure was applied at 100° C. and 0.5 MPa to the temporarily fixed reinforcing material and electrolyte membrane to be heat/pressure-bonded, a heating treatment was then performed at 100° C. for 6 hours, and the T-peel strength after heat/pressure bonding (after curing) was measured.

The T-peel strength (before curing) was measured at a peel rate of 50 mm/minute using Autograph AG-IS (manufactured by Shimadzu Corporation).

The obtained results are shown in Table 3. Putting these results and the results of Test Example 1 together, it has become evident that when the T-peel strength is 0.2 N/mm or less, the initial adhesion force in temporary fixation is proper, the position is easily corrected after bonding, and the electrolyte membrane can be stretched to remove wrinkles.

TABLE 3

| | T-peel strength (N/mm) | |
|---|---|---|
| | Before curing | After curing |
| Example 1 | 0.15 | Electrolyte membrane was broken and measurement was impossible |
| Example 2 | 0.05 | Electrolyte membrane was broken and measurement was impossible |
| Example 3 | 0.20 | Electrolyte membrane was broken and measurement was impossible |
| Example 4 | 0.15 | Electrolyte membrane was broken and measurement was impossible |
| Example 5 | 0.15 | Electrolyte membrane was broken and measurement was impossible |
| Comparative Example 1 | Electrolyte membrane was broken and measurement was impossible | Electrolyte membrane was broken and measurement was impossible |
| Comparative Example 2 | <0.01 | Electrolyte membrane was broken and measurement was impossible |

Test Example 3

Evaluation of Ease of Temporary Fixation to Hydrocarbon-Based Polymer Electrolyte Membrane and Occurrence of Leakage of Cohesive/Adhesive Composition 1. Preparation and Evaluation of Catalyst Layer Laminated Membrane Equipped with Reinforcing Material (1)
<Preparation of Reinforcing Material>
A cohesive/adhesive composition coating liquid of each of Examples 11 to 14 and Comparative Examples 3 and 4 shown in Table 4 was prepared, and the coating liquid was applied onto a plastic substrate (Teonex Q51 (registered trademark, manufactured by Teijin DuPont Films Japan Limited) (thickness 25 μm, having a square opening of 51 mm×51 mm at the center of a square of 100 mm×100 mm)) by a blade coating method, and dried to prepare a reinforcing material provided with a cohesive layer having a thickness of 20 μm.

<Preparation of Catalyst Layer Laminated Membrane>
Catalyst layers 3 of 50 mm×50 mm with a layer thickness of 20 μm were formed on both surfaces of a hydrocarbon-based polymer electrolyte membrane (thickness 25 μm, 100 mm×100 mm) by a transfer method. Specifically, to 2 g of platinum catalyst carrying carbon (amount of platinum carried: 45.7 wt %, manufactured by Tanaka Kikinzoku Kogyo K.K., TEC10E50E) were added 10 g of 1-butanol, 10 g of 2-butanol, 20 g of a fluororesin (5 wt % Nafion Binder, manufactured by Du Pont Company) and 6 g of water, the mixture was stirred and mixed by a disperser to prepare a catalyst forming paste, and the paste was applied onto a polyester film (manufactured by TOYOBO CO., LTD, E5100, 25 μm) so that the weight of platinum after drying was 0.4 mg/cm$^2$, thereby obtaining a catalyst layer transfer film. Then, this catalyst layer transfer film was arranged on both surfaces of the electrolyte membrane with the centers aligned so that the catalyst layers faced the electrolyte membrane side, and heat pressing was performed at 150° C. and 50 MPa for 10 minutes to form catalyst layers on both surfaces of the electrolyte membrane.

<Preparation of Catalyst Layer Laminated Membrane Equipped with Reinforcing Material (1)>
A catalyst layer laminated membrane equipped with a reinforcing material (1) was prepared under the same conditions as those in Test Example 1 using the reinforcing material and catalyst layer laminated membrane obtained as described above.

<Evaluation Item 1: Evaluation of Degree of Leakage of Cohesive/Adhesive Composition>
The degree of leakage of the cohesive/adhesive composition after permanent adhesion was evaluated using the same method as that in Test Example 1.

2. Preparation and Evaluation of Catalyst Layer Laminated Membrane Equipped with Reinforcing Material (2)
<Preparation of Electrolyte Membrane with Reinforcing Material>
The same reinforcing material as that used in the catalyst layer laminated membrane equipped with a reinforcing material (1) was laminated to both surfaces of a hydrocarbon-based polymer electrolyte membrane (thickness 25 μm, 100 mm×100 mm), and pressure-bonded with a finger to be temporarily fixed, followed by performing a heating treatment (permanent adhesion) at 100° C. for 6 hours to prepare an electrolyte membrane equipped with a reinforcing material.

<Evaluation Item 2: Evaluation of Workability in Temporary Fixation>
Workability in temporary fixation of the reinforcing material and the electrolyte membrane during preparation of the electrolyte membrane equipped with a reinforcing material was evaluated using the same method as that in Test Example 1.

<Preparation of Catalyst Layer Laminated Membrane Equipped with Reinforcing Material (2)>
The same catalyst transfer film as that used in preparation of the catalyst layer laminated membrane equipped with a reinforcing material (1) was laminated to both surfaces of the electrolyte membrane in the electrolyte membrane equipped with a reinforcing material, which was obtained as described above, and a heat/pressure treatment was performed at 150° C. and 50 MPa for 10 minutes to prepare a catalyst layer laminated membrane equipped with a reinforcing material (2).

<Evaluation Item 3: Degree of Leakage of Cohesive/Adhesive Composition>

In the catalyst layer laminated membrane equipped with a reinforcing material (2), which was obtained as described above, the degree of leakage of the cohesive/adhesive composition from the interface between the reinforcing material and the electrolyte membrane (lateral spread) was evaluated using the same method as that in Test Example 1.

3. Results

The obtained results are shown in Table 4. As will be apparent from Table 4, when a cohesive/adhesive composition containing a curing agent other than an epoxy resin, an aliphatic polyamide and a polythiol was used together with a hydrocarbon-based polymer electrolyte membrane (Comparative Example 3), the initial adhesion force in temporary fixation was weak, so that pressure-bonding alone led to insufficient temporary fixation, as in the case where a fluorine-based polymer electrolyte membrane was used. When a cohesive/adhesive composition, which contained an epoxy resin and a polythiol but did not contain an aliphatic polyamide, was used (Comparative Example 4), sufficient temporary fixation could not be performed. In contrast, when a cohesive/adhesive composition containing an epoxy resin, an aliphatic polyamide, a polythiol and an ionic liquid was used (Examples 11 to 14), the initial adhesion force in temporary fixation was proper, the position could be corrected after bonding and the electrolyte membrane could be stretched to remove wrinkles of the electrolyte membrane in every example. Further, in Examples 11 to 14, the cohesive/adhesive composition did not leak out from the interface between the reinforcing material and the electrolyte membrane even when subjected to a heat/pressure bonding treatment to laminate a catalyst layer, so that the adhesive layer was stably retained.

TABLE 4

| | | | Examples | | | | Comparative Examples | |
|---|---|---|---|---|---|---|---|---|
| | | | 11 | 12 | 13 | 14 | 3 | 4 |
| Cohesive/ adhesive composition coating liquid | Resin | Aliphatic polyamide#1 | 20 | 20 | 20 | 20 | 20 | — |
| | | Solid bisphenol A type epoxy resin#2 | 50 | 50 | 50 | 50 | 50 | 50 |
| | | Flexible epoxy resin#3 | 15 | 15 | 15 | 15 | 15 | 15 |
| | | NBNR modified epoxy resin#4 | 10 | 10 | 10 | 10 | 10 | 10 |
| | | Polyimide resin#5 | 5 | 5 | 5 | — | 5 | 5 |
| | Curing agent | Solid polythiol#6 | 3.75 | 3.75 | 3.75 | — | — | 3.75 |
| | | Solid polythiol#7 | — | — | — | 8.36 | — | — |
| | | Epoxy adduct#9 | 1.85 | 1.85 | 1.85 | 1.85 | — | — |
| | | Antimony-based organic sulfonium salt#10 | — | — | — | — | 2.25 | — |
| | Curing retardant | Epoxy-phenol-boric acid ester compound#12 | 3.75 | 3.75 | 3.75 | 3.75 | — | — |
| | Dilute solution | Toluene | 30 | 30 | 30 | 30 | 120 | 120 |
| | | Methyl ethyl ketone | 120 | 120 | 120 | 120 | 30 | 30 |
| | Ionic liquid | 1-butyl-3-methylpyridinium (trifluoromethanesulfonic acid) | 0.075 | 0.75 | 7.5 | 0.75 | — | — |
| Evaluation results | Evaluation item 1 Length (mm) of leakage of cohesive/ adhesive composition in catalyst layer laminated membrane equipped with reinforcing material (1) | | <0.2 | <0.2 | <0.2 | 0.2 | 5 | 0.2 |
| | Evaluation item 2 Workability in temporary fixation during preparation of electrolyte membrane equipped with reinforcing material | | A | A | A | A | C | C |
| | Evaluation item 3 Length (mm) of leakage of cohesive/ adhesive composition in catalyst layer laminated membrane equipped with reinforcing material (2) | | <0.2 | <0.2 | <0.2 | <0.2 | 20 | <0.2 |

In the table, the unit of the content of each component contained in the cohesive/adhesive composition coating liquid is "g".
The structures and sources of compounds #1 to #7 #9, #10 and #12 are as described in Table 1.

Test Example 4

Evaluation of T-Peel Strength to Hydrocarbon-Based Polymer Electrolyte Membrane

A reinforcing material provided with a cohesive/adhesive layer (thickness 20 μm) formed of the cohesive/adhesive composition shown in each of Examples 11 to 14 and Comparative Examples 3 and 4 in Table 4 was prepared using the same method as that in Test Example 1 except that a plastic substrate (Teonex Q51 (registered trademark, manufactured by Teijin DuPont Films Japan Limited) (thickness 25 μm, strip of 15 mm×50 mm) was used.

The T-peel strength at the time of temporary fixation (before curing) and the T-peel strength after heat/pressure bonding (after curing) were measured by the same method as that in Test Example 2 using the reinforcing material obtained as described above and a hydrocarbon-based polymer electrolyte membrane (thickness 25 μm, 100 mm×100 mm).

The obtained results are shown in Table 5. From the results, it has been confirmed that the cohesive/adhesive compositions shown in Examples 11 to 14 have a proper initial adhesion force in temporary fixation to a hydrocarbon-based polymer electrolyte membrane, and exhibit a high adhesion force after permanent adhesion (after heat/pressure bonding).

TABLE 5

|  | T-peel strength (N/mm) | |
| --- | --- | --- |
|  | Before curing | After curing |
| Example 11 | 0.10 | Electrolyte membrane was broken and measurement was impossible |
| Example 12 | 0.15 | Electrolyte membrane was broken and measurement was impossible |
| Example 13 | 0.20 | Electrolyte membrane was broken and measurement was impossible |
| Example 14 | 0.15 | Electrolyte membrane was broken and measurement was impossible |
| Comparative Example 1 | <0.01 | Electrolyte membrane was broken and measurement was impossible |
| Comparative Example 2 | <0.01 | Electrolyte membrane was broken and measurement was impossible |

DESCRIPTION OF REFERENCE SIGNS

1 Substrate
2 Cohesive/adhesive layer
3 Reinforcing material
4 Opening
5 Electrolyte membrane
6 Catalyst layer
7 Catalyst layer laminated membrane equipped with reinforcing material
8 Gas diffusion layer
9 Membrane-electrode assembly equipped with reinforcing material

The invention claimed is:

1. A reinforcing material comprising a substrate and a cohesive/adhesive layer laminated on the substrate, wherein the cohesive/adhesive layer comprises an aliphatic polyamide, an epoxy resin and a polythiol, wherein the polythiol is solid at normal temperature.

2. The reinforcing material according to claim 1, wherein the cohesive/adhesive layer further comprises an ionic liquid.

3. The reinforcing material according to claim 2, wherein the content of the ionic liquid in the cohesive/adhesive layer is 0.01 to 10% by mass.

4. A catalyst layer laminated membrane equipped with a reinforcing material, comprising:
a catalyst layer laminated membrane including an electrolyte membrane and catalyst layers formed on both surfaces of the electrolyte membrane excepting outer peripheral edges thereof; and
the reinforcing material according to claim 1,
wherein the reinforcing material is in the shape of a frame having an opening, and
the reinforcing material is adhered on the outer peripheral edge of at least one of the surfaces of the catalyst layer laminated membrane with a cohesive/adhesive layer of the reinforcing material interposed therebetween.

5. A method for production of a catalyst layer laminated membrane equipped with a reinforcing material, the method comprising the steps of:
(i) adhering the reinforcing material according to claim 1, which is in the shape of a frame having an opening, to an outer peripheral edge of an electrolyte membrane with a cohesive/adhesive layer of the reinforcing material interposed therebetween, thereby obtaining an electrolyte membrane equipped with a reinforcing material; and
(ii) laminating a catalyst layer to the electrolyte membrane exposed from the opening in the electrolyte membrane equipped with a reinforcing material, thereby obtaining a catalyst layer laminated membrane equipped with a reinforcing material.

6. A film-electrode assembly equipped with a reinforcing material, comprising:
a membrane-electrode assembly including an electrolyte membrane and catalyst layers and gas diffusion layers sequentially laminated on both surfaces of the electrolyte membrane; and
the reinforcing material according to claim 1,
wherein the reinforcing material is in the shape of a frame having an opening, and
the reinforcing material is adhered on the outer peripheral edge of at least one of the surfaces of the membrane-electrode assembly with a cohesive/adhesive layer of the reinforcing material interposed therebetween.

7. A method for production of a membrane-electrode assembly equipped with a reinforcing material, the method comprising the steps of:
(i) adhering the reinforcing material according to claim 1, which is in the shape of a frame having an opening, to an outer peripheral edge of an electrolyte membrane with a cohesive/adhesive layer of the reinforcing material interposed therebetween, thereby obtaining an electrolyte membrane equipped with a reinforcing material; and
(ii) sequentially laminating a catalyst layer and a gas diffusion layer or laminating a two-layer structure composed of a catalyst layer and a gas diffusion layer to the electrolyte membrane exposed from the opening in the electrolyte membrane equipped with a reinforcing material, thereby obtaining a membrane-electrode assembly equipped with a reinforcing material.

8. A polymer electrolyte fuel cell comprising the membrane-electrode assembly equipped with a reinforcing material according to claim 6.

9. A cohesive/adhesive composition comprising an epoxy resin, an aliphatic polyamide and a polythiol, wherein the polythiol is solid at normal temperature.

10. The cohesive/adhesive composition according to claim 9, further comprising an ionic liquid.

11. The cohesive/adhesive composition according to claim 10, wherein the content of the ionic liquid is 0.01 to 10% by mass.

12. The cohesive/adhesive composition according to claim 9, which is used for adhesion of an electrolyte membrane to be used in a polymer electrolyte fuel cell.

13. A cohesive/adhesive sheet, wherein a cohesive/adhesive layer formed of the cohesive/adhesive composition according to claim 9 is formed on a peelable protective film.

* * * * *